(12) United States Patent
Zang

(10) Patent No.: US 12,397,687 B2
(45) Date of Patent: Aug. 26, 2025

(54) RECLINER HANDLE WITH OVERLOAD PROTECTION DEVICE

(71) Applicants: Magna Seating Inc., Aurora (CA); Creston Zang, Northville, MI (US)

(72) Inventor: Creston Zang, Northville, MI (US)

(73) Assignee: Magna Seating Inc., Aurora (CA)

( * ) Notice: Subject to any disclaimer, the term of this patent is extended or adjusted under 35 U.S.C. 154(b) by 0 days.

(21) Appl. No.: 17/917,363

(22) PCT Filed: Apr. 19, 2021

(86) PCT No.: PCT/US2021/027956
§ 371 (c)(1),
(2) Date: Oct. 6, 2022

(87) PCT Pub. No.: WO2021/212106
PCT Pub. Date: Oct. 21, 2021

(65) Prior Publication Data
US 2023/0150401 A1     May 18, 2023

Related U.S. Application Data

(60) Provisional application No. 63/011,604, filed on Apr. 17, 2020.

(51) Int. Cl.
| | | |
|---|---|---|
| B60N 2/22 | (2006.01) | |
| B60N 2/23 | (2006.01) | |
| B60N 2/235 | (2006.01) | |

(52) U.S. Cl.
CPC ......... B60N 2/2227 (2013.01); B60N 2/2362 (2015.04)

(58) Field of Classification Search
None
See application file for complete search history.

(56) References Cited

U.S. PATENT DOCUMENTS

| | | |
|---|---|---|
| 9,751,432 B2 | 9/2017 | Assmann |
| 10,071,656 B2 | 9/2018 | Wetzig |

FOREIGN PATENT DOCUMENTS

| | | |
|---|---|---|
| DE | 102006062127 | 6/2008 |
| DE | 102016114406 | 2/2017 |
| WO | 2015134587 | 9/2015 |

*Primary Examiner* — Timothy J Brindley
(74) *Attorney, Agent, or Firm* — Miller Canfield

(57) ABSTRACT

A recliner handle with an overload protection device is provided for a vehicle seat having a recliner attached to a recliner B-bracket. The recliner handle is attached to a handle spline having a disc shaft aperture configured to engage with a disc shaft of the recliner. A stop flange attached to the handle spline is configured to frictionally engage with an overload stop attached to the recliner B-bracket. The handle spline is rotatable in a first rotational direction between a first position wherein the stop flange is frictionally engaged with the overload stop and the disc shaft aperture is disengaged from the disc shaft and a second position wherein the disc shaft aperture engages the disc shaft. Rotation of the handle spline in a second rotational direction from the first position is restricted by the stop flange frictionally engaged with the overload stop.

26 Claims, 18 Drawing Sheets

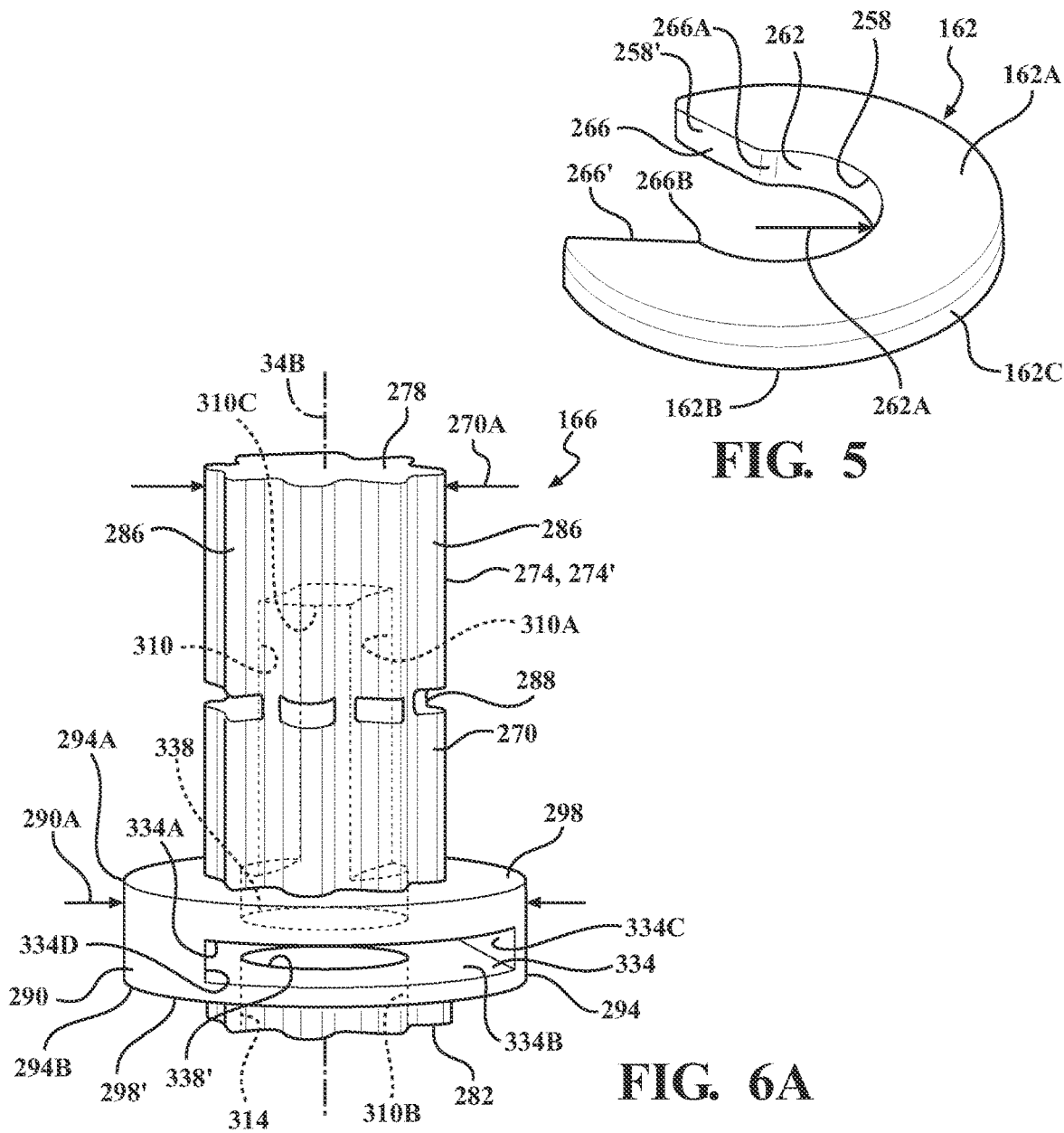
FIG. 5
FIG. 6A
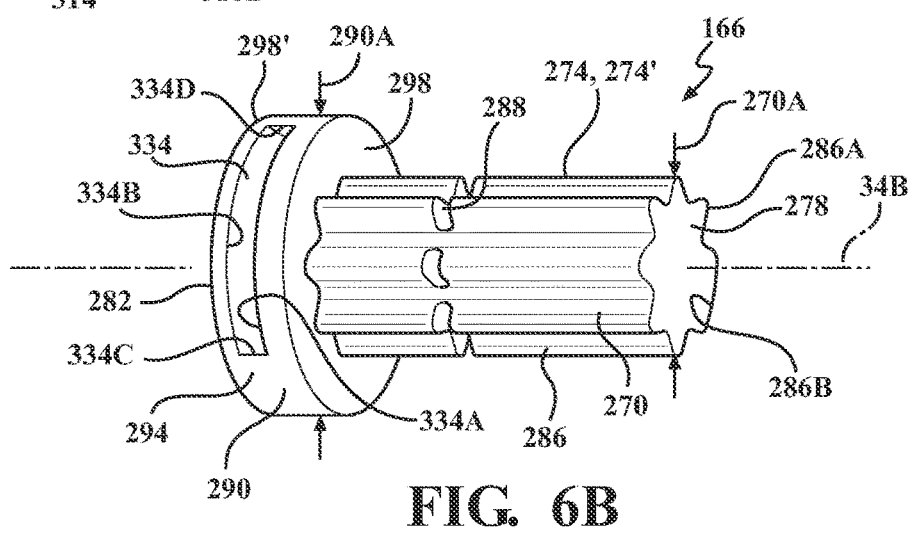
FIG. 6B

RECLINER HANDLE WITH OVERLOAD PROTECTION DEVICE

CROSS-REFERENCE TO RELATED APPLICATIONS

This application claims priority to and all the benefits of U.S. Provisional Application 63/011,604, filed Apr. 17, 2020, and entitled "Recliner Handle With Overload Protection Device", the disclosure of which is hereby incorporated by reference in its entirety.

BACKGROUND OF THE INVENTION

1. Field of the Invention

The present invention relates to a recliner handle configured to unlock a recliner of a vehicle seat so that the vehicle seat can be reclined. More specifically, the present invention relates to an overload protection device preventing abuse torque applied to the recliner handle from being transferred to the recliner of the vehicle seat.

2. Description of Related Art

Many vehicles today have vehicle seats with a seat back that is rotatably coupled to a seat cushion by a recliner. Typical recliners have a locked condition wherein the seat back is locked in a selected rotational position with respect to the seat cushion. Further, the typical recliners have an unlocked condition wherein the seat back can be reclined. One known recliner has a disc shaft projecting from the recliner. Rotating the disc shaft between a home angular position and a release angular position reconfigures the known recliner between the locked condition and the unlocked condition.

A recliner handle is typically operatively coupled to the disc shaft of the known recliner for rotating the disc shaft between the home angular position and the release angular position. Typically, the recliner handle has a home position that corresponds to the disc shaft being in the home angular position with the known recliner being in the locked condition. In addition, the recliner handle typically has a recline release position that corresponds to the disc shaft being in the release angular position with the known recliner being in the unlocked condition. When the recliner handle is in the home position, lifting upward on the recliner handle applies torque to the recliner handle. The upward torque applied to the recliner handle rotates the recliner handle and the connected disc shaft. When the recliner handle reaches the recline release position, the disc shaft is correspondingly rotated to the release angular position, and the known recliner is unlocked.

The known recliner includes a return spring biasing the recliner handle towards the home position to ensure the known recliner is placed in the locked condition when upward torque is not applied to the recliner handle. Thus, removal of upward torque on the recliner handle results in the recliner handle being rotated back to the home position which also rotates the disc shaft back to the home angular position and returns the known recliner to the locked condition.

However, the known recliner can be overloaded and potentially damaged when the recliner handle is in the home position and the recliner handle is pushed downward. In this case, downward torque applied to the recliner handle transfers excessive or abuse torque to the known recliner which can damage internal components within the known recliner.

Thus, it is desirable to prevent damage to the recliner when excessive downward pressure (abuse torque) is applied to the recliner handle when the recliner handle is in the home position. Further, it is desirable to transfer abuse torque applied to the recliner handle away from the recliner. Finally, it is desirable to include an overload protection device between the recliner handle and the recliner configured to avoid overloading the recliner when downward torque is applied to the recliner handle.

SUMMARY OF THE INVENTION

The present invention relates to a recliner handle with an overload protection device for a vehicle seat having a recliner attached to a recliner B-bracket. The recliner handle is fixedly coupled to a handle spline having a disc shaft aperture configured to engage with a disc shaft operatively coupled to the recliner. A stop flange attached to the handle spline is configured to frictionally engage with an overload stop attached to the recliner B-bracket. The handle spline is rotatable in a first rotational direction between a first position wherein the stop flange is frictionally engaged with the overload stop and the disc shaft aperture is disengaged from the disc shaft and a second position wherein the disc shaft aperture engages the disc shaft. Rotation of the handle spline in a second rotational direction from the first position is restricted by the stop flange frictionally engaged with the overload stop.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is a perspective view of the clinch ring of FIG. 2;

FIG. 6A is a partially transparent perspective view of the handle spline of FIG. 2, illustrating a disc shaft aperture within the handle spline;

FIG. 6B is a perspective view of the handle spline of FIG. 6A;

DETAILED DESCRIPTION OF THE EMBODIMENTS

FIGS. 1 through 26 illustrate an overload protection device 10, 10' connecting a recliner handle 14 to a recliner 18 of a vehicle seat 22 according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
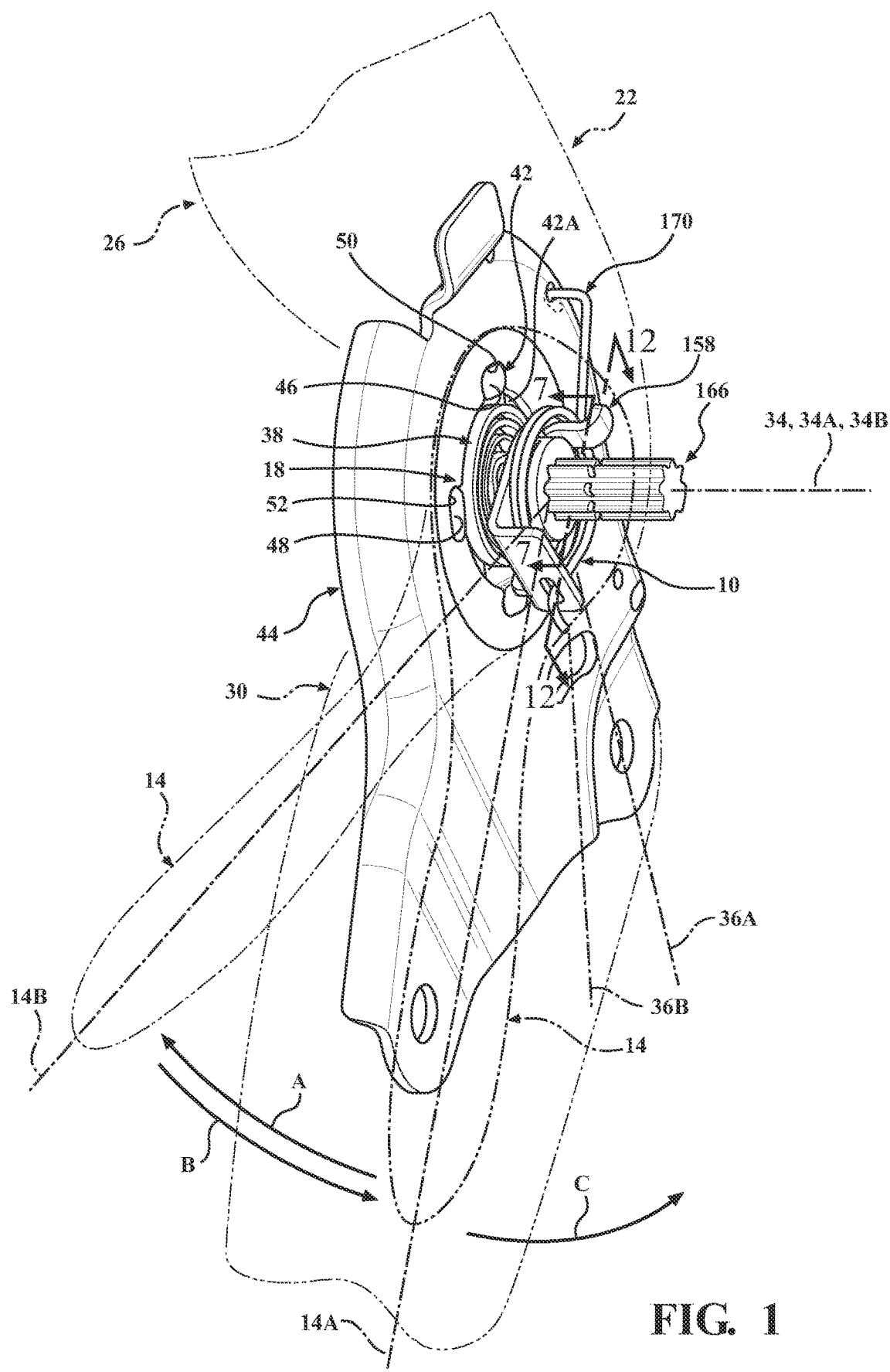
FIG. 1 is a fragmentary perspective view of a vehicle seat having an overload protection device operatively coupled between a recliner and a recliner handle, according to one embodiment of the present invention.

FIG. 1 shows a perspective view of a portion of the vehicle seat 22 having a seat back 26 rotatably connected to a seat cushion 30 by the recliner 18, according to a first embodiment. The recliner handle 14 is fixedly coupled to the overload protection device 10 and rotatably coupled to the recliner 18. As shown in FIG. 1, the recliner handle 14 is repositionable between a home position 14A and a recline release position 14B about an axis of rotation 34 of the recliner 18. The home position 14A of the recliner handle 14 corresponds to a home angular position 36A of the recliner 18. Further, the recline release position 14B of the recliner handle 14 corresponds to a release angular position 36B of the recliner 18.

Applying upward torque on the recliner handle 14 and rotating the recliner handle 14 in a first rotational direction A (illustrated by arrow A shown in FIG. 1) about the axis of rotation 34 of the recliner 18 from the home position 14A towards the recline release position 14B unlocks the recliner 18 such that the seat back 26 can be rotated with respect to the seat cushion 30. In the embodiment shown in FIG. 1, the recliner handle 14 is rotated upward in a clockwise direction A with respect to the axis of rotation 34 of the recliner 18 to unlock the recliner 18.

Figure 11:
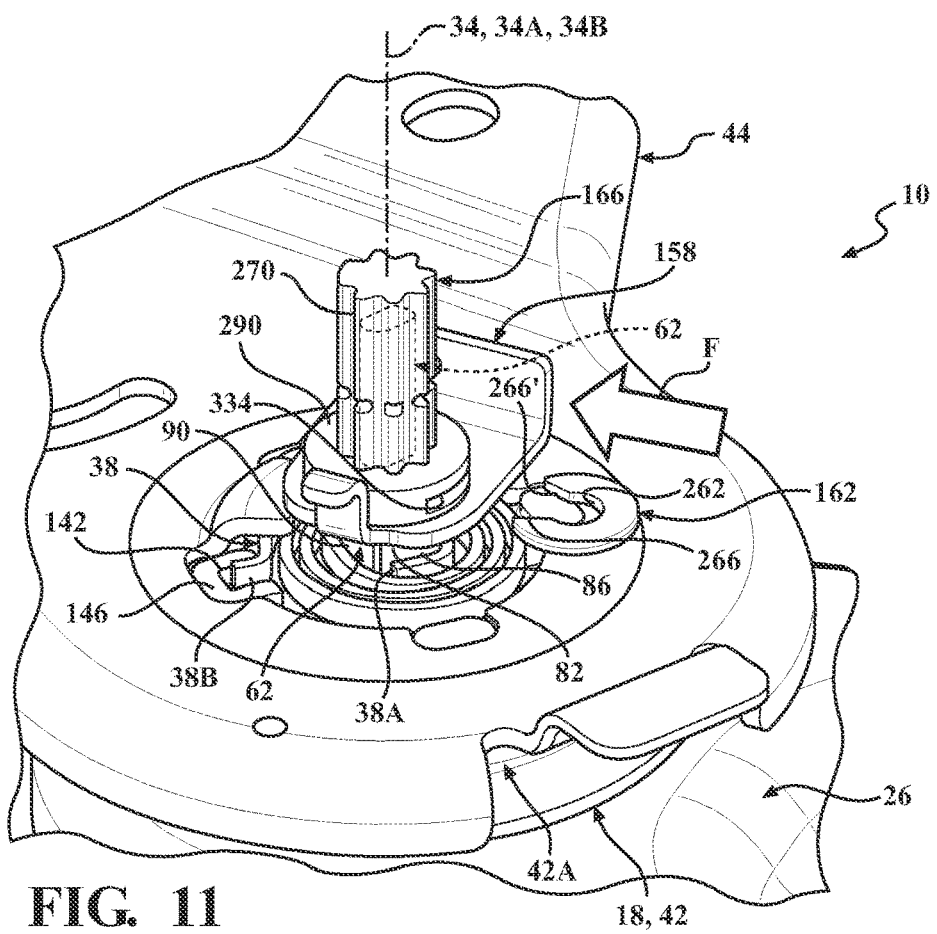
FIG. 11 is a perspective view of the recliner of FIG. 10 after assembly of the spring bracket and handle spline, illustrating insertion of the clinch ring into the handle spline.

Referring to FIG. 11, a return spring 38 is operatively coupled between the recliner 18 and the recliner handle 14. As shown in FIG. 1, the return spring 38 rotationally biases the recliner handle 14 towards the home position 14A. When the recliner handle 14 is spaced apart from the home position 14A, the return spring 38 automatically rotates the recliner handle 14 in a second rotational direction B (arrow B) towards the home position 14A when the recliner handle 14 is released. The second rotational direction B is opposite the first rotational direction A. If the recliner handle 14 is rotated upward in the clockwise direction A to reposition the recliner handle 14 from the home position 14A to the recline release position 14B, then the recliner handle 14 is rotated downward in the counterclockwise direction B to reposition the recliner handle 14 from the recline release position 14B back to the home position 14A.

With certain recliners 18, further rotation of the recliner handle 14 in the second rotational direction B past the home position 14A (illustrated by arrow C shown in FIG. 1) can overload the recliner 18 and cause damage to internal components of the recliner 18. In addition, rotational motion of the recliner handle 14 in the direction of arrow C past the home position 14A can overlock the recliner 18. Overlocking the recliner 18 can potentially damage the recliner 18. The overload protection device 10 prevents the recliner 18 from being overlocked when downward torque is applied to the recliner handle 14 when the recliner handle 14 is in the home position 14A. More specifically, the overload protection device 10 restricts rotation of the recliner handle 14 past the home position 14A in the second rotational direction C and diverts applied torque to the recliner handle 14 away from the recliner 18.

Figure 2:
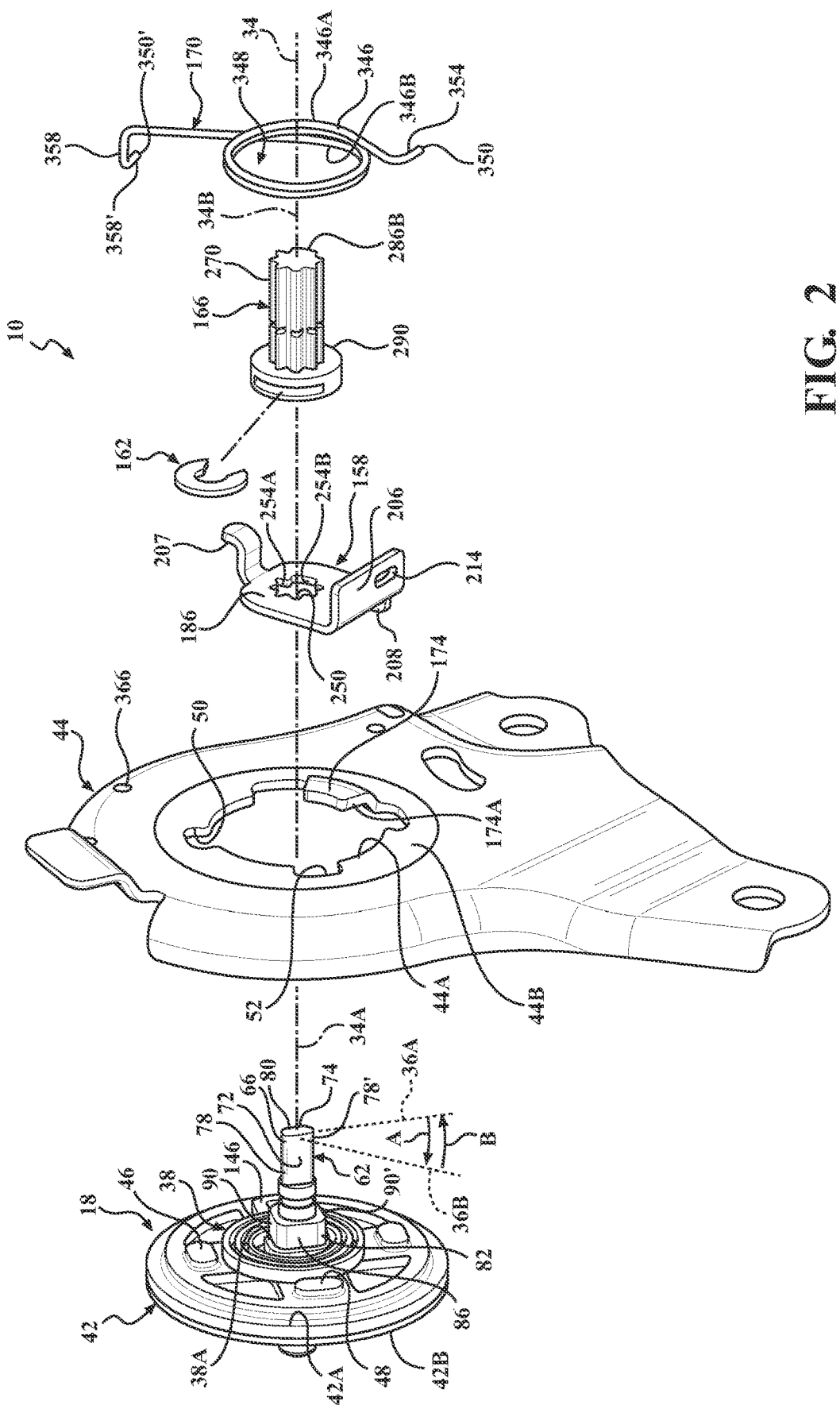
FIG. 2 is an exploded view of the overload protection device of FIG. 1, showing the recliner, a recliner B-bracket having a cutout, a spring bracket, a clinch ring, a handle spline, and a handle inertia spring, according to one embodiment of the present invention.

An exploded view of the overload protection device 10 is shown in FIG. 2. Referring to FIG. 2, the recliner 18 includes a disc recliner assembly 42 having a guide plate 42A rotatably coupled to a tooth plate 42B. An exemplary disc recliner assembly 42 is an iDiSC 5 disc recliner assembly manufactured by Magna Seating Inc. As shown in FIG. 1, the guide plate 42A of the disc recliner assembly 42 is fixedly coupled to a recliner B-bracket 44 with the recliner B-bracket 44 being fixedly coupled to the seat cushion 30. The guide plate 42A includes a plurality of bosses 46, 48 configured to matingly engage with respective notches 50, 52 in the recliner B-bracket 44. It is understood that in alternate embodiments, attachment of the disc recliner assembly 42 to the recliner B-bracket 44 may include different means of fixedly coupling the guide plate 42A to the recliner B-bracket 44 without varying the scope of the invention.

Figure 10:
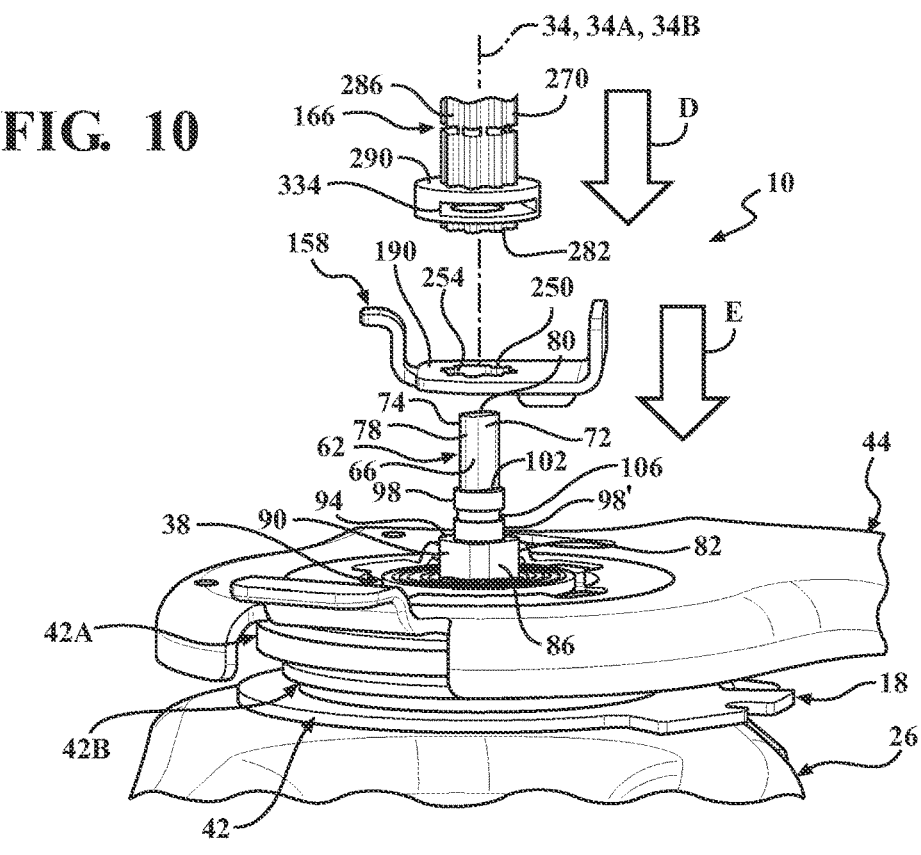
FIG. 10 is an exploded perspective view of the recliner of FIG. 1, illustrating assembly of the spring bracket and the handle spline with the disc shaft of the recliner.

As best shown in FIG. 10, the tooth plate 42B is fixedly coupled to the seat back 26. Referring to FIGS. 1 and 10, when the tooth plate 42B is unlocked with respect to the guide plate 42A (by rotating the recliner handle 14 to the recline release position 14B), the seat back 26 is rotatable with respect to the recliner B-bracket 44 and the attached seat cushion 30. In certain embodiments, the recliner B-bracket 44 and the attached seat cushion 30 are also rotatable with respect to the seat back 26 when the guide plate and tooth plates 42A, 42B are unlocked relative to each other.

Referring to FIGS. 1 and 10, the tooth plate 42B is locked to the guide plate 42A when the recliner handle 14 is in the home position 14A. Rotation of the tooth plate 42B with respect to the guide plate 42A is prevented while the recliner handle 14 is in the home position 14A. Thus, rotation of the seat back 26 with respect to the seat cushion 30 is prevented when the recliner handle 14 is in the home position 14A.

Referring to FIG. 2, a disc shaft 62 projects from the disc recliner assembly 42 with a longitudinal axis 34A of the disc shaft 62 aligned with the axis of rotation 34 of the recliner 18. The disc shaft 62 is formed of a metal, a plastic, and/or combinations thereof. Further, the disc shaft 62 is configured to lock and unlock the rotation of the tooth plate 42B with respect to the guide plate 42A based on the angular position 36A, 36B of the disc shaft 62. Rotating the disc shaft 62 from the home angular position 36A to the release angular position 36B in first rotational direction A unlocks the guide plate 42A and the tooth plate 42B such that one of the guide plate 42A and the tooth plate 42B can be rotated with respect to the other one of the guide plate 42A and the tooth plate 42B. In other embodiments, both the guide plate 42A and the tooth plate 42B can be rotated about the axis of rotation 34 when the disc recliner assembly 42 is unlocked. Thus, in certain embodiments, the seat cushion 30 can be rotated towards and/or away from the seat back 26 as well as the seat back 26 being rotatable towards and/or away from the seat cushion 30.

Figure 3:
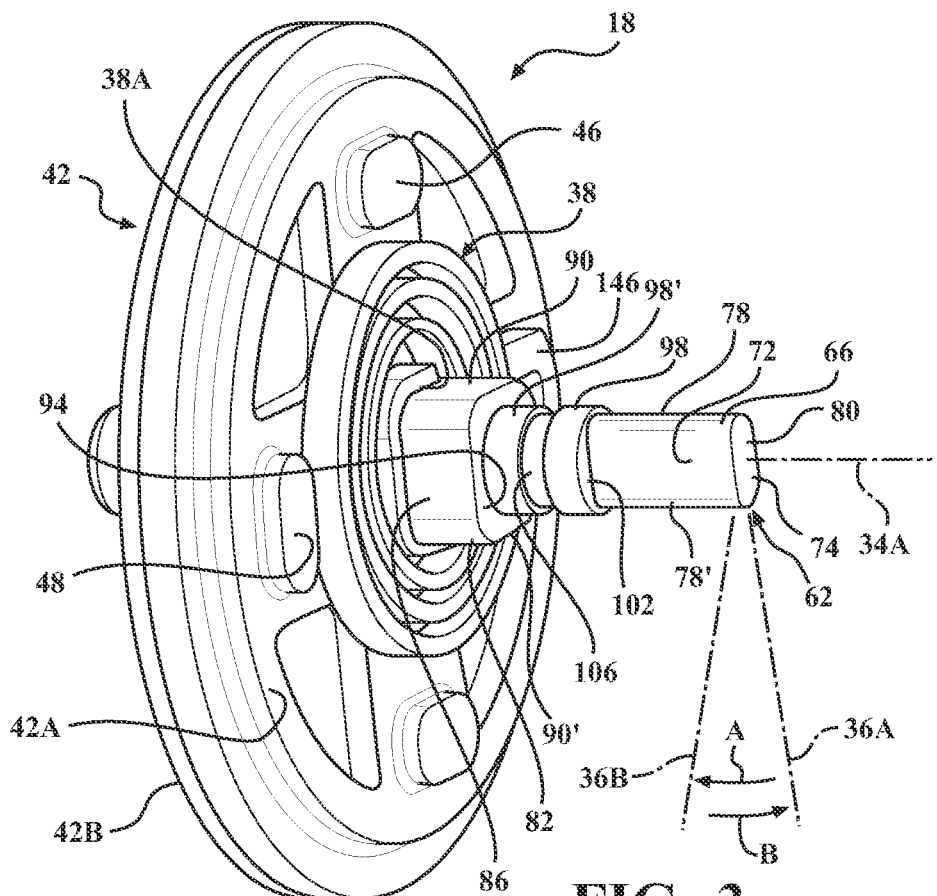
FIG. 3 is a perspective view of the recliner of FIG. 2, illustrating a disc shaft projecting from the recliner.
Figure 7:
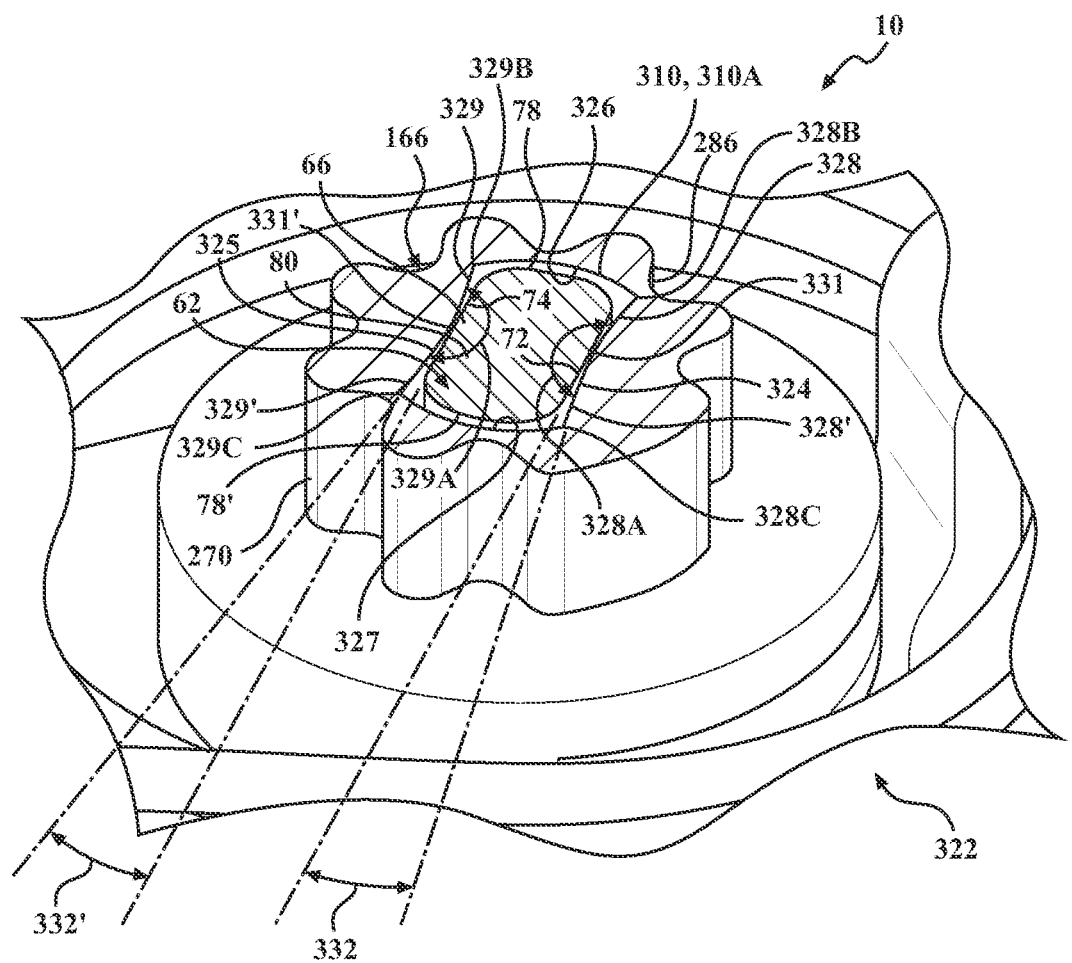
FIG. 7 is an enlarged cutaway perspective view of the handle spline and the disc shaft taken along section line 7-7 of FIG. 1, showing the disc shaft aperture in the handle spline and the disc shaft in a neutral position with the disc shaft aperture disengaged from the disc shaft.
Figure 8:
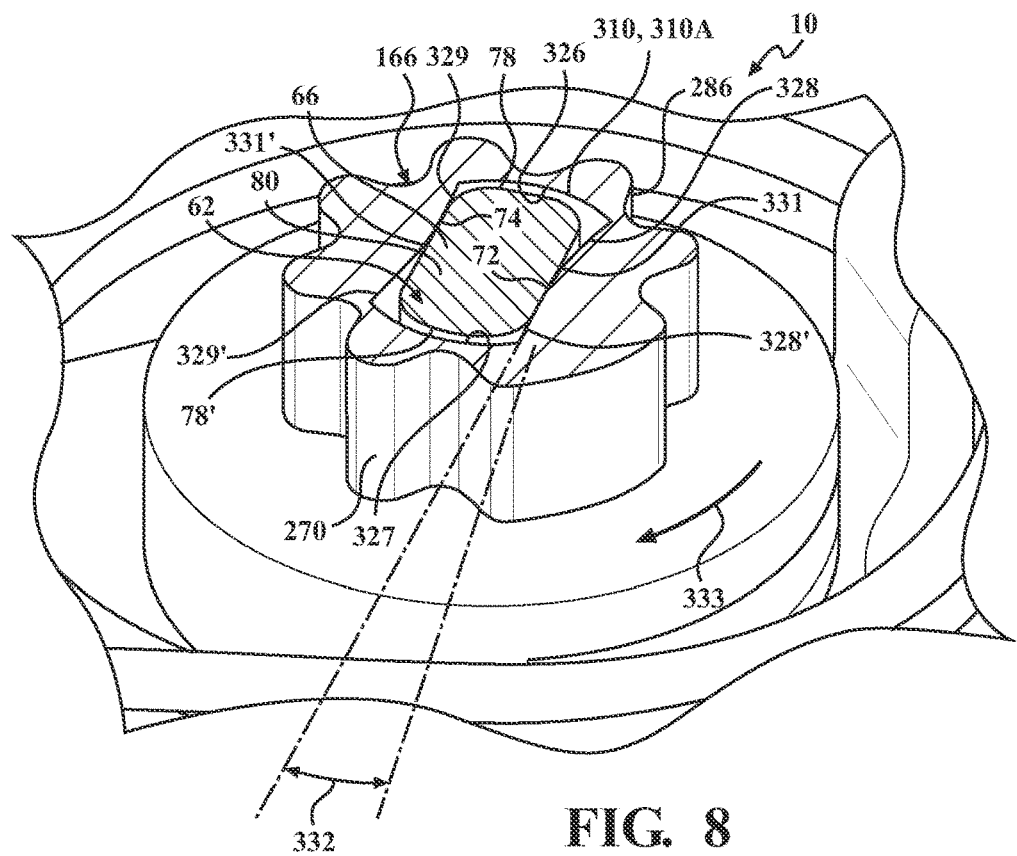
FIG. 8 is an enlarged cutaway perspective view of the handle spline and the disc shaft of FIG. 7, showing the handle spline rotated in a clockwise direction with respect to the disc shaft with the disc shaft aperture engaged with the disc shaft.
Figure 9:
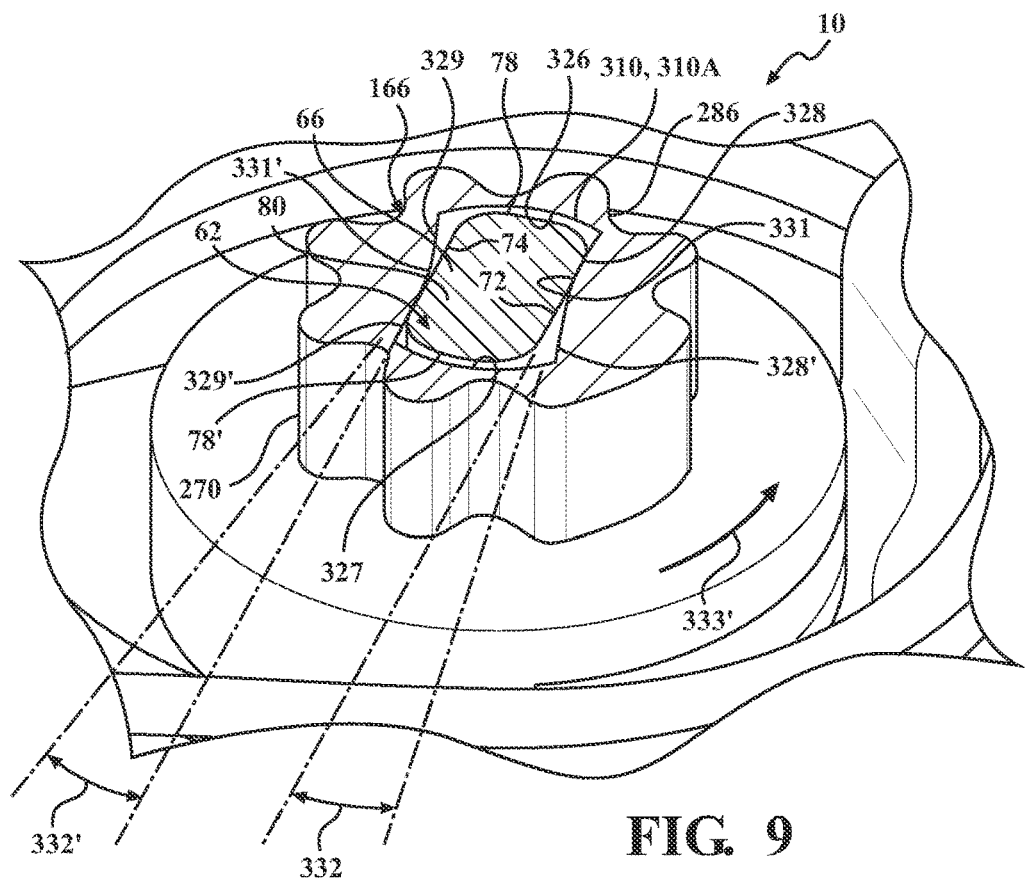
FIG. 9 is an enlarged cutaway perspective view of the handle spline and the disc shaft of FIG. 7, showing the handle spline rotated in a counterclockwise direction with respect to the disc shaft with the disc shaft aperture engaged with the disc shaft.

An enlarged view of the recliner 18 is shown in FIG. 3. Referring to FIGS. 2 and 3, the disc shaft 62 includes an elongated shaft end portion 66 extending along the longitudinal axis 34A of the disc shaft 62. The elongated shaft end portion 66 has a rounded rectangular shaped cross-section with opposing shaft flat side portions 72, 74, shaft curved side portions 78, 78' extending between the adjacent shaft flat side portions 72, 74, and a distal end surface 80. The distal end surface 80 of the elongated shaft end portion 66 of the disc shaft 62 is also shown in FIGS. 7, 8, and 9.

Figure 12:
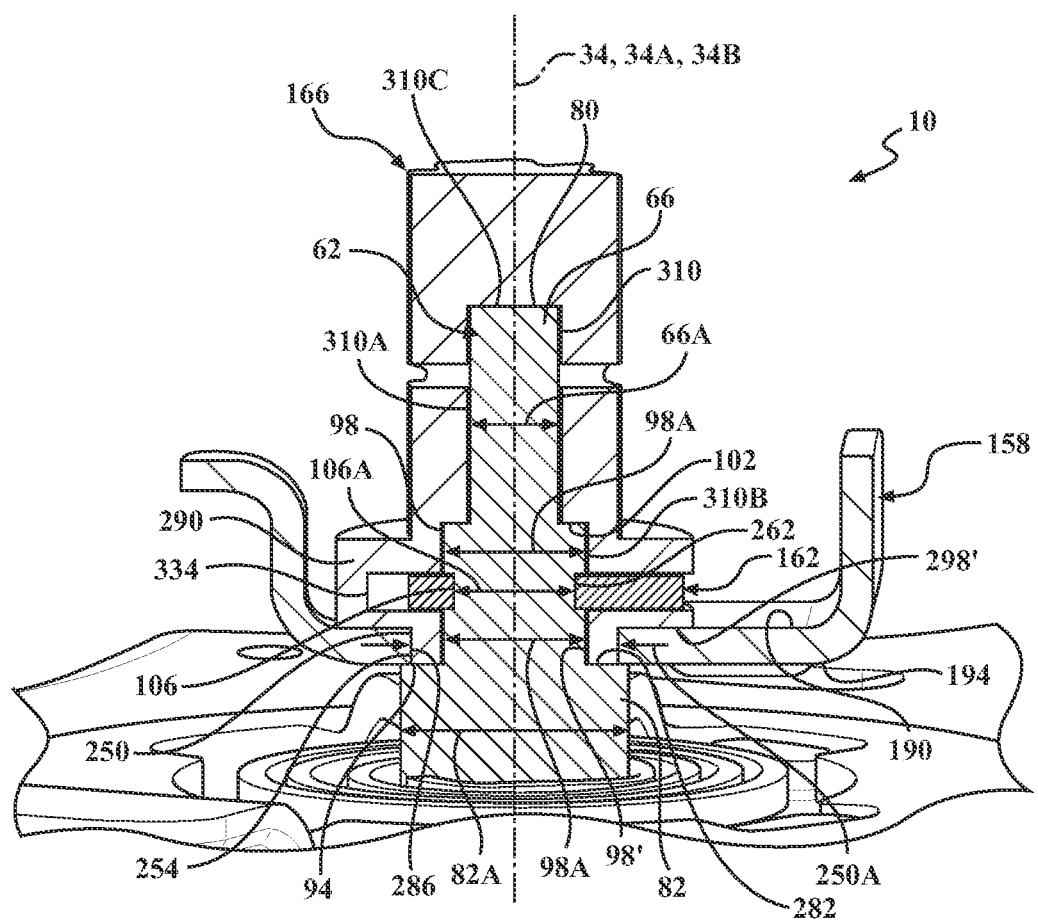
FIG. 12 is a cross-sectional view of the recliner and the overload protection device taken along section line 12-12 of FIG. 1, illustrating the handle spline, the spring bracket, and the clinch ring assembled with the disc shaft.

As shown in FIGS. 2 and 3, the disc shaft 62 has a base portion 82 having a generally cylindrical cross-sectional shape with a plurality of flat sides 86, 90, 90' and a base end face 94. A cross-sectional view of a portion of the overload protection device 10 is shown in FIG. 12 and illustrates additional details of the disc shaft 62. Referring to FIG. 12, a central cylindrical portion 98 projects from the base end face 94 of the base portion 82 along the longitudinal axis 34A of the disc shaft 62. The central cylindrical portion 98 has an outer diameter 98A that is less than a maximum diameter 82A of the base portion 82. Further, the central cylindrical portion 98 has a central end face 102 extending generally parallel to and spaced apart from the base end face 94 of the base portion 82. A channel 106 extends circumferentially around an outer perimeter 98' of the central cylindrical portion 98 spaced apart from both the central end face 102 and the base end face 94. The channel 106 has an outer diameter 106A that is less than the outer diameter 98A of the central cylindrical portion 98. The elongated shaft end portion 66 projects from the central end face 102 of the central cylindrical portion 98. Further, the elongated shaft end portion 66 has a maximum diameter 66A that is less than the outer diameter 98A of the central cylindrical portion 98. Also, the base portion 82, the central cylindrical portion 98, and the elongated shaft end portion 66 are aligned with the longitudinal axis 34A of the disc shaft 62. It will be appreciated that the size, shape, and length of the disc shaft 62 may vary without altering the scope of the invention.

Referring to FIGS. 2, 3, and 11, the return spring 38 is a spiral torsional spring having a first spring end 38A fixedly coupled to the base portion 82 of the disc shaft 62 and a second spring end 38B fixedly coupled to a slot 142 in a boss 146 projecting from the guide plate 42A. The first spring end 38A of the return spring 38 is wrapped around the base portion 82 of the disc shaft 62 such that the first spring end 38A frictionally engages with one or more of the flat sides 86, 90, 90' of the base portion 82. In certain embodiments, the return spring 38 is sized and shaped such that spring tension retains the first spring end 38A in frictional engagement with the base portion 82 of the disc shaft 62 and retains the second spring end 38B in an engaged position with the slot 142 in the boss 146 projecting from the guide plate 42A. In alternate embodiments, one or both of the first and second spring ends 38A, 38B are fixedly coupled to the disc shaft 62 and the slot 142, respectively, by a mechanical fastener, a welded connection, or the like. With the second spring end 38B of the return spring 38 retained within the slot 142 in the boss 146 projecting from the guide plate 42A, rotating the recliner handle 14 upward from the home position 14A towards the recline release position 14B rotates the disc shaft 62 from the home angular position 36A to the release angular position 36B and preloads the return spring 38. When the recliner handle 14 is released, the spring torque in the return spring 38 urges the disc shaft 62 to rotate towards the home angular position 36A. Returning the disc shaft 62 to the home angular position 36A returns the recliner handle 14 to the home position 14A and locks the disc recliner assembly 42. It will be appreciated that the size and shape of the return spring 38 may vary without altering the scope of the invention.

As shown in FIG. 2, the overload protection device 10 includes the disc shaft 62 projecting from the recliner 18, a spring bracket 158, a clinch ring 162, a handle spline 166, a handle inertia spring 170, and a tab 174 formed on the recliner B-bracket 44. It will be appreciated that the overload protection device 10 may include additional components without varying the scope of the invention.

Figure 4A:
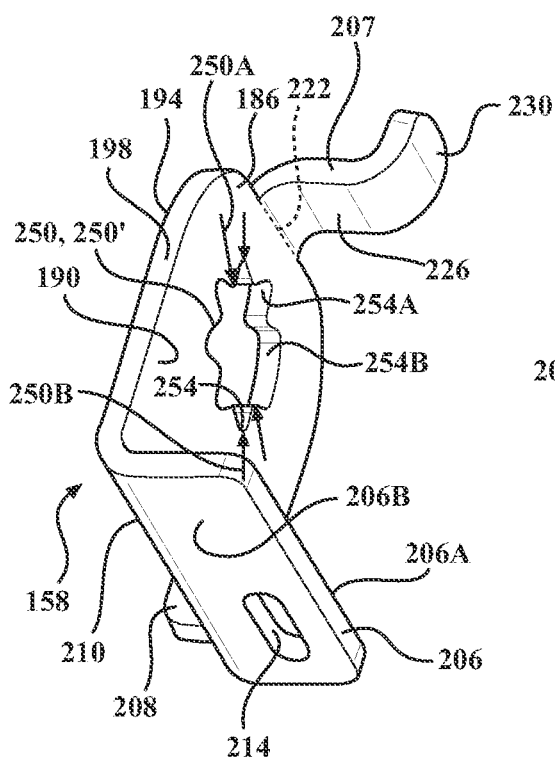
FIGS. 4A and 4B are perspective views of the spring bracket of FIG. 2.
Figure 4B:
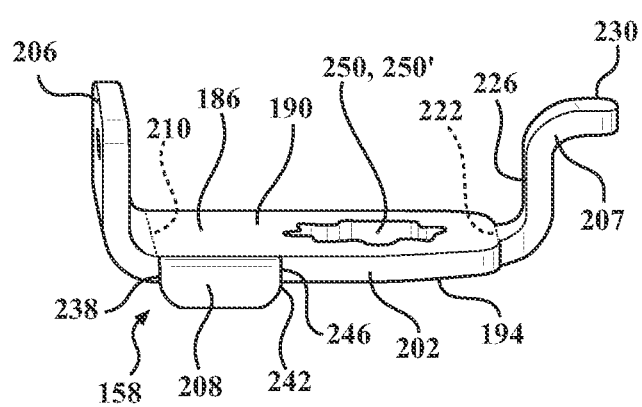

Referring to FIGS. 2, 4A, and 4B, the spring bracket 158 has a generally flat main bracket portion 186 with opposing upper and lower bracket surfaces 190, 194 spaced apart by first and second bracket side walls 198, 202 defining a width of the spring bracket 158. Extending from the main bracket portion 186 are a first flange 206, a second flange 207, and a stop flange 208. The first flange 206 extends upward from a first end 210 of the main bracket portion 186 such that the first flange 206 and the upper bracket surface 190 of the main bracket portion 186 are generally perpendicular to one another and form an "L" shape. The first flange 206 has opposing inner and outer surfaces 206A, 206B and an elongated spring slot 214 extending between the opposing inner and outer surfaces 206A, 206B. The second flange 207 extends upward from a second end 222 of the main bracket portion 186. The second flange 207 includes a flange base portion 226 adjacent the main bracket portion 186 and a distal flange end portion 230 that projects at an angle from the flange base portion 226. The flange base portion 226 is generally parallel to the first flange 206 with the distal flange end portion 230 being generally parallel to the main bracket portion 186. The stop flange 208 extends downward from the second bracket side wall 202 of the main bracket portion 186. The stop flange 208 includes distal and proximal side walls 238, 242. The proximal side wall 242 includes a stop surface 246.

As shown in FIGS. 2, 4A, and 4B, an alignment aperture 250 extends between the upper and lower bracket surfaces 190, 194 of the main bracket portion 186. The alignment aperture 250 has a contoured inner profile 250' with a plurality of splines 254 extending between the opposing upper and lower bracket surfaces 190, 194. The plurality of splines 254 includes at least one narrow spline 254A and at least one wide spline 254B configured to matingly engage with at least one narrow spline 286A and at least one wide spline 286B located on the handle spline 166. The wide spline 254B of the alignment aperture 250 is an alignment feature for assembling the spring bracket 158 and the handle spline 166 with a predetermined relative orientation. Further, the alignment aperture 250 has a minimum opening diameter 250A and a maximum opening diameter 250B. The minimum opening diameter 250A of the alignment aperture 250 is less than the maximum diameter 82A of the base portion 82 of the disc shaft 62, as shown in FIG. 12. The spring bracket 158 is assembled with the disc shaft 62 with the disc shaft 62 passing through the alignment aperture 250. After assembly, the lower bracket surface 194 of the spring bracket 158 is supported by the base end face 94 of the base portion 82 of the disc shaft 62. In addition, the spring bracket 158 is formed of a metal, a plastic, and/or combinations thereof. It will be appreciated that the size and shape of the spring bracket 158, including the first and second flanges 206, 207, the stop flange 208, the spring slot 214, and the alignment aperture 250 may vary without altering the scope of the invention.

As shown in FIG. 5, the clinch ring 162 is a generally ring-shaped disc with opposing top and bottom surfaces 162A, 162B, an outer side surface 162C extending between the opposing top and bottom surfaces 162A, 162B, and a passageway 258 extending between the opposing top and bottom surfaces 162A, 162B forming a notch 258' in the clinch ring 162. The notch 258' defining the passageway 258 includes a first lead-in surface 266, a second lead-in surface 266', and an inner cylindrical surface 262 extending between inner ends 266A, 266B of the adjacent first and second lead-in surfaces 266, 266'. The inner cylindrical surface 262 has a ring inner radius 262A approximately equal to or greater than half of the outer diameter 106A of the channel 106 in the central cylindrical portion 98 of the disc shaft 62. The first and second lead-in surfaces 266, 266' are configured to allow attachment of the clinch ring 162 to the disc shaft 62 within the channel 106 in the central cylindrical portion 98 of the disc shaft 62. The clinch ring 162 is formed of a metal, a plastic, and/or combinations thereof. It will be appreciated that the size and shape of the clinch ring 162 may vary without altering the scope of the invention.

As shown in FIGS. 2, 6A, and 6B, the handle spline 166 has a splined portion 270 having a generally cylindrical shape with an outer surface 274 extending between an upper end surface 278 and a lower end surface 282. The outer surface 274 of the handle spline 166 has an outer profile 274' sized and shaped to matingly engage with the inner profile 250' of the alignment aperture 250 in the spring bracket 158. Referring to FIGS. 6A and 6B, the outer surface 274 of the handle spline 166 includes a plurality of splines 286 spaced around the outer profile 274' of the splined portion 270 and extending along a longitudinal axis 34B of the handle spline 166. The longitudinal axis 34B of the handle spline 166 is aligned with the axis of rotation 34 of recliner 18 and the longitudinal axis 34A of the disc shaft 62 when the handle spline 166 is assembled with the disc shaft 62, as illustrated in FIG. 2.

Referring to FIGS. 4A and 6B, the plurality of splines 286 of the handle spline 166 includes at least one narrow spline 286A and at least one wide spline 286B configured to matingly engage with the at least one narrow spline 254A and the at least one wide spline 254B within the alignment aperture 250 of the spring bracket 158 when the handle spline 166 is assembled with the spring bracket 158. The wide splines 254B, 286B of the alignment aperture 250 and the handle spline 166 are alignment features for assembling the spring bracket 158 and the handle spline 166 with a predetermined relative orientation.

The assembly of the handle spline 166 and the spring bracket 158 onto the disc shaft 62 is shown in FIG. 10. FIG. 12 shows a cross-sectional view of the handle spline 166 assembled with the spring bracket 158 with the lower end surface 282 of the handle spline 166 inserted into the alignment aperture 250 in the spring bracket 158.

As shown in FIG. 6A, the splined portion 270 of the handle spline 166 optionally includes a handle channel 288 extending around the outer periphery of the splined portion 270 and spaced apart from the upper end surface 278 of the splined portion 270. The handle channel 288 is sized and shaped to matingly engage with and retain a snap feature on the recliner handle 14. In other embodiments, the handle channel 288 is sized and shaped to receive a clip ring or similar fastening device to retain the recliner handle 14 in an engaged position with the handle spline 166. In certain embodiments, the handle channel 288 is omitted from the handle spline 166 when an alternate method of attaching the recliner handle 14 to the handle spline 166 is selected.

Referring to FIGS. 6A and 6B, the handle spline 166 includes a cylindrical ring 290 projecting from the splined portion 270. The cylindrical ring 290 is generally cylindrically-shaped and has a longitudinal axis aligned with the handle spline 166 longitudinal axis 34B. Further, the cylindrical ring 290 is spaced apart from the upper end surface 278 and the lower end surface 282 of the handle spline 166. The handle channel 288 is also spaced apart from the cylindrical ring 290 and positioned between the cylindrical ring 290 and the upper end surface 278 of the handle spline 166. The cylindrical ring 290 has an outer cylindrical surface 294 having an outer diameter 290A greater than a maximum diameter 270A of the splined portion 270. Further, the cylindrical ring 290 includes opposing upper and lower surfaces 298, 298' extending between respective upper and lower edges 294A, 294B of the outer cylindrical surface 294 and the outer surface 274 of the splined portion 270. The lower surface 298' of the cylindrical ring 290 is spaced apart from the lower end surface 282 of the handle spline 166 such that the lower surface 298' of the cylindrical ring 290 frictionally engages with the upper bracket surface 190 of the spring bracket 158 when the lower end surface 282 of the handle spline 166 is inserted into the alignment aperture 250 of the spring bracket 158, as shown in FIG. 12.

Referring to FIGS. 6A and 12, the handle spline 166 includes an elongated disc shaft aperture 310 aligned with the longitudinal axis 34B of the handle spline 166 with a lower opening 314 extending through the lower end surface 282 of the handle spline 166. The disc shaft aperture 310 is sized and shaped to matingly engage with the disc shaft 62. Thus, the disc shaft aperture 310 has an elongated inner aperture portion 310A sized and shaped to matingly engage with the elongated shaft end portion 66 of the disc shaft 62 while maintaining about 6 degrees of loss motion between the disc shaft 62 and the disc shaft aperture 310. It is understood that the amount of degrees of loss motion between the disc shaft 62 and the disc shaft aperture 310 can be greater or less than about 6 degrees without varying the scope of the invention. Further, the disc shaft aperture 310 has an elongated outer aperture portion 310B sized and shaped to matingly engage with the central cylindrical portion 98 of the disc shaft 62. In addition, the disc shaft aperture 310 has an upper end surface 310C configured to frictionally engage with the distal end surface 80 of the disc shaft 62 when assembled as part of the overload protection device 10.

Referring to FIGS. 7 through 9, there is about 6 degrees of lost motion between the handle spline 166 and the disc shaft 62 when the handle spline 166 is rotated. FIG. 7 shows a cross-sectional view of the handle spline 166 and the disc shaft 62 taken along section line 7-7 of FIG. 1 showing the disc shaft 62 and the handle spline 166 in a neutral position 322. The neutral position 322 shown in FIG. 7 corresponds to the disc shaft 62 being in the home angular position 36A with the recliner handle 14 being unrestrained and aligned with the home position 14A, as illustrated in FIGS. 1 and 3. As shown in FIG. 7, the elongated shaft end portion 66 of the disc shaft 62 has opposing shaft flat side portions 72, 74 and shaft curved side portions 78, 78' extending between the opposing shaft flat side portions 72, 74.

In contrast, as shown in FIG. 7, the cross-sectional shape of the inner aperture portion 310A of the disc shaft aperture 310 in the handle spline 166 has a bowtie-shaped appearance, more generally described as an irregular concave hexagonal shape. The inner aperture portion 310A includes opposing first and second side walls 324, 325 and opposing first and second end walls 326, 327. The first side wall 324 comprises a first side portion 328 extending at an angle from a second side portion 328' such that an interior angle 328A between the first side portion 328 and the second side portion 328' is greater than 180 degrees, as measured within the disc shaft aperture 310. Similarly, the second side wall 325 includes a third side portion 329 extending at an angle from a fourth side portion 329' such that an interior angle 329A between the third side portion 329 and the fourth side portion 329' is greater than 180 degrees, as measured within the disc shaft aperture 310. Further, the first side portion 328 is generally parallel to and spaced apart from the fourth side portion 329'. Similarly, the second side portion 328' is generally parallel to and spaced apart from the third side portion 329. In addition, the first side portion 328 is non-parallel to the second side portion 328'. Likewise, the third side portion 329 is non-parallel to the fourth side portion 329'. In certain embodiments, one or more of the first, second, third, and fourth side portions 328, 328', 329, 329' include curved surfaces, tapered surfaces, and/or generally flat surfaces.

Also shown in FIG. 7, extending between ends 328B, 329B of the first side portion 328 and the third side portion 329 of the disc shaft aperture 310 is the first end wall 326. Likewise, extending between ends 328C, 329C of the second side portion 328' and the fourth side portion 329' is the second end wall 327. In the embodiment shown in FIG. 7 the first and second end walls 326, 327 are curved walls. The inner aperture portion 310A of the disc shaft aperture 310 is sized and shaped such that a first junction 331 of the first side portion 328 and the second side portion 328' and a second junction 331' of the third side portion 329 and the fourth side portion 329' frictionally engage the respective adjacent shaft flat side portions 72, 74 of the disc shaft 62 when assembled. It is understood that in certain embodiments the first and second junctions 331, 331' are spaced apart from the adjacent shaft flat side portions 72, 74 without altering the scope of the invention. When the disc shaft 62 is centered within the disc shaft aperture 310 in the neutral position 322 shown in FIG. 7, each of the first through fourth side portions 328, 328', 329, 329' of the disc shaft aperture 310 taper away from the adjacent shaft flat side portions 72, 74 of the disc shaft 62 with an approximate loss motion angle 332, 332'. Thus, each of the first through fourth side portions 328, 328', 329, 329' of the disc shaft aperture 310 are essentially disengaged from the adjacent shaft flat side portions 72, 74 of the disc shaft 62 when the handle spline 166 and the disc shaft 62 are in the neutral position 322 shown in FIG. 7. The approximate loss motion angle 332, 332' represents the loss motion between the handle spline 166 and the disc shaft 62 when the handle spline 166 is rotated.

In order to engage the disc shaft aperture 310 of the handle spline 166 with the disc shaft 62, the handle spline 166 is rotated through approximately the loss motion angle 332, 332', as illustrated in FIGS. 8 and 9. Once the disc shaft aperture 310 has fully engaged with the disc shaft 62, additional rotation of the handle spline 166 results in the disc shaft 62 rotating with the handle spline 166.

When the recliner handle 14 is in the home position 14A shown in FIG. 1, the handle spline 166 and the disc shaft 62 are in the neutral position 322 with the second side portion 328' of the disc shaft aperture 310 disengaged from the adjacent shaft flat side portion 72 of the disc shaft 62, as shown in FIG. 7. More specifically, the second side portion 328' of the disc shaft aperture 310 tapers away from the adjacent shaft flat side portion 72 of the disc shaft 62 by the loss motion angle 332 when the handle spline 166 and the disc shaft 62 are in the neutral position 322.

Upward torque applied to the recliner handle 14 rotates the recliner handle 14 and the attached handle spline 166 in the clockwise direction A illustrated in FIG. 1. The clockwise rotation A of the recliner handle 14 rotates the handle spline 166 in a clockwise direction 333 shown in FIG. 8. Initial rotation of the handle spline 166 less than the loss motion angle 332 does not result in rotation of the disc shaft 62 because the disc shaft aperture 310 is disengaged from the disc shaft 62. Thus, applying torque in the clockwise direction A to the recliner handle 14 and rotating the recliner handle 14 less than the loss motion angle 332 results in the handle spline 166 rotating independent of the disc shaft 62 since the disc shaft 62 is disengaged from the disc shaft aperture 310. The disc shaft 62 engages with the disc shaft aperture 310 when the recliner handle 14 and the attached handle spline 166 rotate approximately the loss motion angle 332 in the clockwise direction 333. The disc shaft 62 rotates with the handle spline 166 after the recliner handle 14 and the handle spline 166 rotate more than the loss motion angle 332.

The disc shaft 62 is engaged with the disc shaft aperture 310, as illustrated in FIG. 8, when the recliner handle 14 is spaced apart from the home position 14A by at least the loss motion angle 332. Referring to FIG. 8, as the handle spline 166 is rotated in the clockwise direction 333 from the neutral position 322 shown in FIG. 7, the second side portion 328' of the disc shaft aperture 310 is pivoted towards the adjacent shaft flat side portion 72 of disc shaft 62. The second side portion 328' of the disc shaft aperture 310 frictionally engages with the adjacent shaft flat side portion 72 of the disc shaft 62 when the handle spline 166 is rotated through the loss motion angle 332 in the clockwise direction 333. The third side portion 329 of the disc shaft aperture 310 likewise frictionally engages with the adjacent shaft flat side portion 74 when the handle spline 166 is rotated in the clockwise direction 333 since the third side portion 329 and the second side portion 328' of the disc shaft aperture 310 are generally parallel. Additional rotation of the handle spline 166 in the clockwise direction 333 causes the disc shaft 62 to rotate with the handle spline 166 since the second and third side portions 328', 329 of the disc shaft aperture 310 have engaged with the adjacent shaft flat side portions 72, 74 of the disc shaft 62. Thus, the loss motion angle 332 illustrates the amount of loss motion between the handle spline 166 and the disc shaft 62 when the handle spline 166 is rotated in the clockwise direction 333 from the neutral position 322.

As shown in FIG. 7, the fourth side portion 329' of the disc shaft aperture 310 tapers away from the adjacent shaft flat side portion 74 of the disc shaft 62 by the loss motion angle 332' when the handle spline 166 and the disc shaft 62 are in the neutral position 322. When the handle spline 166 is rotated in a counterclockwise direction 333' from the neutral position 322 of FIG. 7, the fourth side portion 329' is pivoted towards the adjacent shaft flat side portion 74 of disc shaft 62, as illustrated in FIG. 9. The fourth side portion 329' frictionally engages with the adjacent shaft flat side portion 74 of the disc shaft 62 when the handle spline 166 is rotated through the loss motion angle 332' in the counterclockwise direction 333'. The first side portion 328 of the disc shaft aperture 310 likewise frictionally engages with the adjacent shaft flat side portion 72 when the handle spline 166 is rotated in the counterclockwise direction 333' since the fourth side portion 329' and the first side portion 328 of the disc shaft aperture 310 are generally parallel. Additional rotation of the handle spline 166 in the counterclockwise direction 333' causes the disc shaft 62 to rotate with the handle spline 166 since the first and fourth side portions 328, 329' of the disc shaft aperture 310 have engaged with the adjacent shaft flat side portions 72, 74 of the disc shaft 62. Thus, the loss motion angle 332' illustrates the amount of loss motion between the handle spline 166 and the disc shaft 62 when the handle spline 166 is rotated in the counterclockwise direction 333' from the neutral position 322. In certain embodiments, the loss motion angle 332 is approximately equal to the loss motion angle 332'. However, it will be appreciated that the loss motion angle 332 can be greater than or less than loss motion angle 332' without varying the scope of the invention. Further, the clockwise direction 333 and the counterclockwise direction 333' of the handle spline 166, as viewed in FIGS. 8 and 9, is generically described as first and second rotational directions 333, 333', respectively.

The handle spline 166 has a clinch ring slot 334 extending radially through part of the cylindrical ring 290, as shown in FIGS. 6A and 12. The clinch ring slot 334 is configured to allow insertion of the clinch ring 162 into the clinch ring slot 334. Further, the clinch ring slot 334 is sized and shaped such that the clinch ring 162 is aligned with the channel 106 in the disc shaft 62 when the spring bracket 158 and the handle spline 166 are assembled on the disc shaft 62, as shown in FIG. 12. The clinch ring 162, the clinch ring slot 334, and the channel 106 in the disc shaft 62 are sized and shaped such that insertion of the clinch ring 162 into the clinch ring slot 334 does not restrict the rotational movement of the handle spline 166 with respect to the disc shaft 62. In particular, the clinch ring 162 does not restrict the rotation of the handle spline 166 with respect to the disc shaft 62 while the handle spline 166 is rotated in the first and second rotational directions 333, 333' through at least an angle equal or greater than the loss motion angle 332, 332' from the neutral position 322 shown in FIG. 7. It will be appreciated that the size and shape of the clinch ring slot 334, the channel 106 in the disc shaft 62, and the clinch ring 162 may vary without altering the scope of the invention.

As shown in FIG. 6A, the clinch ring slot 334 includes opposing upper and lower surfaces 334A, 334B as well as opposing side surfaces 334C, 334D. The disc shaft aperture 310 forms an upper opening 338 in the upper surface 334A of the clinch ring slot 334. A lower opening 338' is formed by the disc shaft aperture 310 in the lower surface 334B of the clinch ring slot 334.

Referring to FIG. 2, the handle inertia spring 170 is a coil spring having a coiled portion 346 having a central passageway 348, a first spring end 350 extending from an upper side 346A of the handle inertia spring 170, and a second spring end 350' extending from a lower side 346B of the handle inertial spring 170. The handle inertia spring 170 is formed of a metal.

In the embodiment shown in FIG. 2, the first spring end 350 of the handle inertia spring 170 is bent into an "L" shape having a first retention portion 354 extending at an angle from the handle inertia spring 170. The first spring end 350 and the first retention portion 354 are sized and shaped such that the first spring end 350 can be passed through the spring slot 214 in the spring bracket 158. The first retention portion 354 retains the first spring end 350 in frictional engagement with the spring bracket 158 when the handle inertia spring 170 is assembled as part of the overload protection device 10, as illustrated in FIG. 14.

Figure 13:
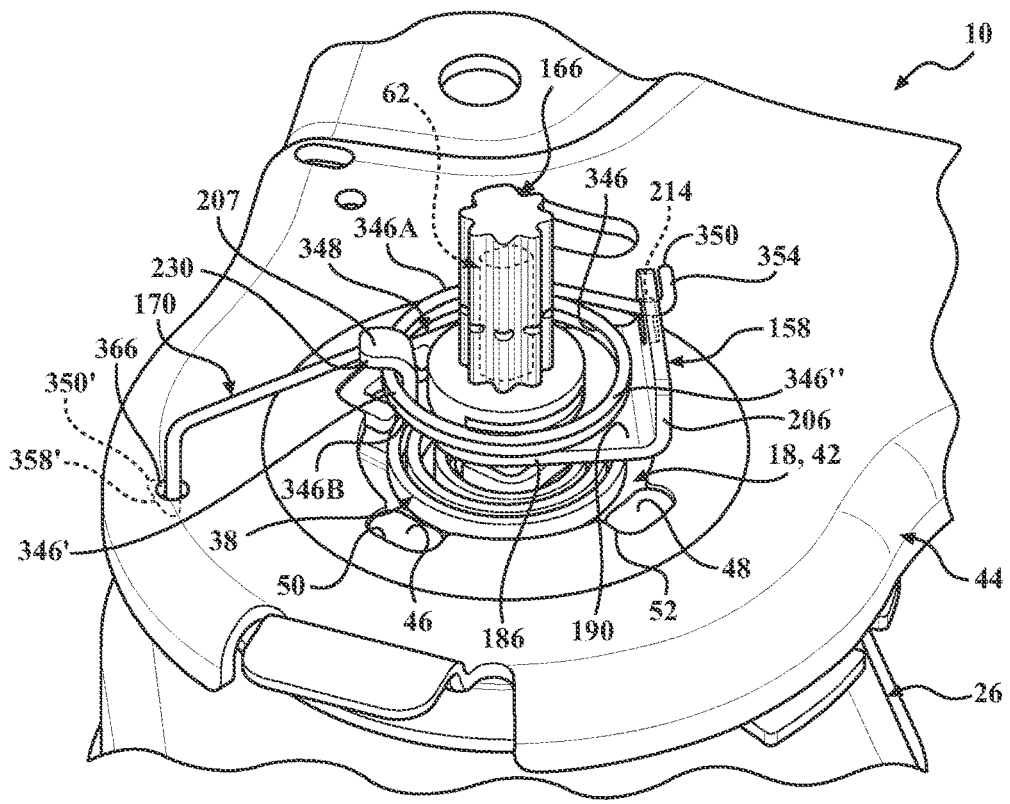
FIG. 13 is a perspective view of the recliner and the overload protection device of FIG. 11 after assembly of the clinch ring with the handle spline, illustrating assembly of the handle inertia spring with the spring bracket and the recliner B-bracket.

Also shown in FIG. 2, the second spring end 350' of the handle inertia spring 170 includes a bent portion 358 generally extending in the direction of the axis of rotation 34 of the recliner 18 after assembly with the spring bracket 158 and the recliner B-bracket 44. A second retention portion 358' extends at an angle from the bent portion 358 of the handle inertia spring 170. As shown in FIG. 14, the second retention portion 358' and the bent portion 358 of the handle inertia spring 170 are sized and shaped such that the second spring end 350' can be passed through a spring retention hole 366 in the recliner B-bracket 44 when the handle inertia spring 170 is assembled as part of the overload protection device 10. More specifically, the second spring end 350' is configured to pass through the spring retention hole 366 in the recliner B-bracket 44 when the handle spline 166 and the second flange 207 of the spring bracket 158 are passed through the central passageway 348 of the coiled portion 346, as illustrated in FIG. 13. Further, the second retention portion 358' and the bent portion 358 are sized and shaped such that the second retention portion 358' retains the second spring end 350' through the spring retention hole 366 after the second spring end 350' is inserted through the spring retention hole 366 in the recliner B-bracket 44. It will be appreciated that the size and shape of the handle inertia spring 170, including the first and second spring ends 350, 350', may vary without altering the scope of the invention.

Figure 14:
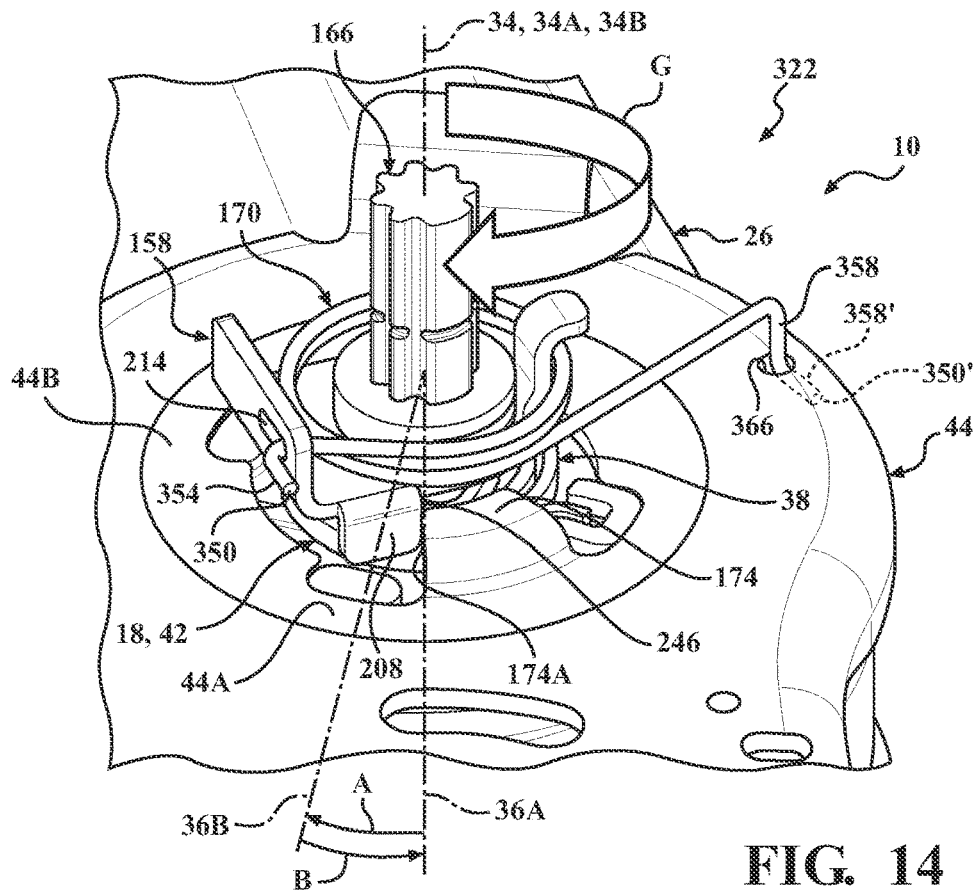
FIG. 14 is a perspective view of the recliner and overload protection device of FIG. 13 in a home angular position with a stop flange of the spring bracket frictionally engaged with a cutout attached to the recliner B-bracket, illustrating the handle spline being rotated towards a recline release position.

The tab 174 formed on the recliner B-bracket 44 is shown in FIGS. 2 and 14. Referring to FIG. 2, the recliner B-bracket 44 includes a mounting portion 44A configured to matingly engage with bosses 46, 48 projecting from the guide plate 42A of the disc recliner assembly 42. In various embodiments, the mounting portion 44A is integrally formed with the recliner B-bracket 44. In alternate embodiments, the mounting portion 44A is a separate component assembled with the recliner B-bracket 44. Referring to FIG. 14, the recliner B-bracket 44 and the mounting portion 44A can be formed out of a metal, a plastic, and/or combinations thereof. Preferably, at least the mounting portion 44A of the recliner B-bracket 44 is formed from a metal. In certain embodiments, the mounting portion 44A is a metal bracket that is fixedly coupled to the recliner B-bracket 44.

Referring to FIGS. 2 and 14, the tab 174 formed on the recliner B-bracket 44 is bent away from a disc-shaped portion 44B of the mounting portion 44A of the recliner B-bracket 44. In alternate embodiments, the tab 174 is a separate component fixedly coupled to the mounting portion 44A and/or to the recliner B-bracket 44. The tab 174 includes an overload stop 174A formed by an edge surface of the tab 174. The overload stop 174A is offset from the disc-shaped portion 44B of the mounting portion 44A. The tab 174 is sized and shaped such that the stop surface 246 of the stop flange 208 of the spring bracket 158 will frictionally engage the overload stop 174A of the tab 174 when the spring bracket 158 and handle spline 166 are assembled on the disc shaft 62 and the spring bracket 158 rotated towards the tab 174 in the second rotational direction B shown in FIG. 14. It will be appreciated that the size and shape of the recliner B-bracket 44, the mounting portion 44A, the tab 174, and the overload stop 174A may vary without altering the scope of the invention.

FIGS. 10 through 13 illustrate an installation process of the overload protection device 10 onto the recliner 18. Referring to FIG. 10, the recliner 18 is shown assembled with the recliner B-bracket 44 and the seat back 26. The recliner 18 includes the disc recliner assembly 42 comprising the guide plate 42A, the tooth plate 42B, and the disc shaft 62 as well as other components. Further, the return spring 38 is shown assembled with the disc recliner assembly 42 in FIG. 10. The lower end surface 282 of the handle spline 166 is inserted into the alignment aperture 250 in the spring bracket 158 with the plurality of splines 286 of the handle spline 166 aligned with the plurality of splines 254 in the alignment aperture 250, as illustrated by arrow D shown in FIG. 10. The handle spline 166 is assembled with the disc shaft 62 after the handle spline 166 is assembled with the spring bracket 158, as illustrated by arrow E shown in FIG. 10. Alternatively, the spring bracket 158 can be assembled with the disc shaft 62 prior to the handle spline 166 being inserted into the alignment aperture 250 of the spring bracket 158. In both cases, a portion of the disc shaft 62 passes through the alignment aperture 250 of the spring bracket 158.

FIG. 11 shows the handle spline 166 and the spring bracket 158 assembled on the disc shaft 62 of the disc recliner assembly 42. The clinch ring 162 is inserted into the clinch ring slot 334 in the handle spline 166, as illustrated by arrow F shown in FIG. 11. The clinch ring 162 axially retains the handle spline 166 on the disc shaft 62.

A cross-sectional view of the assembly of the disc shaft 62, the spring bracket 158, the handle spline 166, and the clinch ring 162 is shown in FIG. 12. Referring to FIG. 12, the lower bracket surface 194 of the spring bracket 158 abuts the base end face 94 of the disc shaft 62. In addition, the lower end surface 282 of the handle spline 166 either abuts the base end face 94 of the disc shaft 62 or the lower end surface 282 is spaced apart from the base end face 94 of the disc shaft 62, depending on specific dimensions of the individual components. Further, the lower end surface 282 of the handle spline 166 is positioned within the alignment aperture 250 in the spring bracket 158. The spring bracket 158 will rotate with the handle spline 166 since the plurality of splines 254 in the alignment aperture 250 are matingly engaged with the plurality of splines 286 of the handle spline 166.

While the spring bracket 158 and the handle spline 166 are shown assembled with the disc shaft 62 in FIG. 12, the handle spline 166 is not fixedly coupled to the disc shaft 62. The handle spline 166 is selectively coupled to the disc shaft 62 based in part on the rotational position of the handle spline 166 with respect to the disc shaft 62. As shown in FIGS. 7 through 9, there is about 6 degrees of lost motion between the handle spline 166 and the disc shaft 62 (illustrated by the loss motion angles 332, 332') when the handle spline 166 is rotated from the neutral position 322. It is understood that the magnitude of the loss motion angles 332, 332' can vary without altering the scope of the invention.

Also shown in FIG. 12, the lower surface 298' of the cylindrical ring 290 of the handle spline 166 abuts the upper bracket surface 190 of the spring bracket 158. The clinch ring slot 334 in the handle spline 166 is aligned with the channel 106 of the disc shaft 62 such that the clinch ring 162 can be inserted into the clinch ring slot 334. Preferably, a portion of the inner cylindrical surface 262 of the clinch ring 162 is positioned within the channel 106, preventing movement of the handle spline 166 in the direction of the axis of rotation 34.

After the spring bracket 158 and the handle spline 166 are assembled with the disc shaft 62, the handle inertia spring 170 is attached to the spring bracket 158 and the recliner B-bracket 44 as illustrated in FIG. 13. Referring to FIG. 13, a first portion 346' of the coiled portion 346 of the handle inertia spring 170 is positioned underneath the distal flange end portion 230 of the second flange 207 of the spring bracket 158 such that the upper surface 346A of the coiled portion 346 abuts the distal flange end portion 230 of the spring bracket 158. A second portion 346" of the coiled portion 346 of the handle inertia spring 170 is placed on the spring bracket 158 such that the lower side 346B of the coiled portion 346 abuts the upper bracket surface 190 of the main bracket portion 186 of the spring bracket 158 with the handle spline 166 positioned in the central passageway 348 of the handle inertia spring 170. The first spring end 350 of the handle inertia spring 170 is slid through the spring slot 214 in the first flange 206 of the spring bracket 158. The second spring end 350' of the handle inertia spring 170 is passed through the spring retention hole 366 in the recliner B-bracket 44. The spring torque of the handle inertia spring 170 retains the first retention portion 354 of the first spring end 350 of the handle inertia spring 170 in frictional engagement with the first flange 206 of the spring bracket 158. In addition, the spring torque of the handle inertia spring 170 retains the second retention portion 358' of the second spring end 350' of the handle inertia spring 170 in frictional engagement with the recliner B-bracket 44.

Referring to FIG. 14, the spring torque within the handle inertia spring 170 rotationally biases the spring bracket 158 and handle spline 166 towards the home angular position 36A in the second rotational direction B. The stop surface 246 on the spring bracket 158 is frictionally engaged with the overload stop 174A on the recliner B-bracket 44 when the handle spline 166 is in the home angular position 36A. More specifically, the return spring 38 which is operatively coupled between the recliner 18 and the disc shaft 62 biases the disc shaft 62 towards the home angular position 36A. As such, the return spring 38 automatically rotates the disc shaft 62 towards the home angular position 36A when the disc shaft 62 is unloaded by an externally-applied load. Further, the handle inertia spring 170 rotationally biases the spring bracket 158 towards the home angular position 36A. When the stop surface 246 on the spring bracket 158 frictionally engages with the overload stop 174A on the recliner B-bracket 44, and the disc shaft 62 is in the home angular position 36A, the disc shaft aperture 310 of the handle spline 166 is automatically positioned in the neutral position 322 with the disc shaft 62 disengaged from the disc shaft aperture 310.

Figure 15:
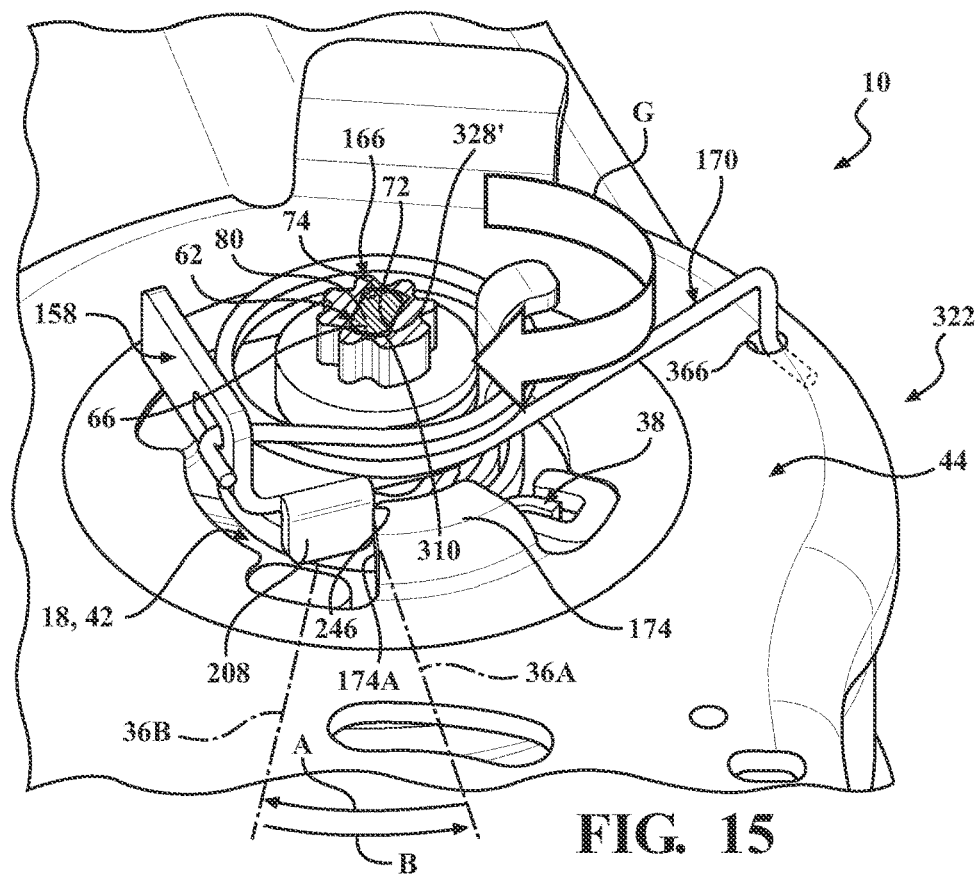
FIG. 15 is an enlarged cutaway perspective view of the recliner and the overload protection device of FIG. 14 in the home angular position, illustrating the handle spline being rotated towards the release angular position.

FIG. 15 shows a cutaway view of the disc shaft 62 and the handle spline 166 of FIG. 14 illustrating the spring bracket 158 and the handle spline 166 in the home angular position 36A with the disc shaft 62 disengaged from the disc shaft aperture 310 of the handle spline 166. The home angular position 36A shown in FIG. 15 corresponds to the neutral position 322 of the disc shaft 62 and the handle spline 166 shown in FIG. 7. Referring to FIG. 15, when the handle spline 166 is unloaded (i.e., an externally-applied load is not applied to the recliner handle 14 attached to the handle spline 166), the spring torque in the handle inertia spring 170 ensures that the spring bracket 158 and the coupled handle spline 166 are in the home angular position 36A. If the handle spline 166 is spaced apart from the home angular position 36A and the recliner handle 14 is unrestrained, the handle inertial spring 170 automatically rotates the spring bracket 158 in the second rotational direction B until the stop surface 246 of the stop flange 208 frictionally engages the overload stop 174A of the recliner B-bracket 44.

Referring to FIGS. 14 and 15, the return spring 38 of the recliner 18 rotationally biases the disc shaft 62 towards the home angular position 36A in the second rotational direction B when the disc shaft 62 is unloaded. The return spring 38 ensures that the recliner 18 is placed in the locked condition when upward torque is not applied to the recliner handle 14. When the recliner 18 includes a cam that locks and unlocks the recliner 18, rotating the disc shaft 62 in the first rotational direction A is alternatively described as a cam unlocking direction A. Similarly, rotating the disc shaft 62 in the second rotational direction B is alternatively described as a cam locking direction B.

During normal use, upward torque (first rotational direction A) is applied to the recliner handle 14 to initiate normal recline operation of the vehicle seat 22, as shown in FIG. 1. Rotation of the recliner handle 14 in the first rotational direction A applies torque to the handle spline 166 causing the handle spline 166 to be rotated in a clockwise direction (arrow G), as viewed in FIGS. 14 and 15. As illustrated in FIGS. 7 and 8, there is lost motion present between the handle spline 166 and the disc shaft 62 of about 6 degrees. It will be understood that the loss motion between the handle spline 166 and the disc shaft 62 can be greater or less than about 6 degrees without varying the scope of the invention. Referring to FIGS. 7, 8, and 15, the handle spline 166 rotates in the clockwise direction (arrow 333 in FIG. 8, arrow G in FIG. 15) through approximately the loss motion angle 332 before the second and third side portions 328', 329 of the disc shaft aperture 310 frictionally engage the respective shaft flat side portions 72, 74 of the disc shaft 62. This initial rotation of the handle spline 166 takes up the looseness between the disc shaft aperture 310 and the disc shaft 62. The disc recliner assembly 42 functions as a typical direct drive disc recliner assembly after looseness between the disc shaft aperture 310 and the disc shaft 62 is taken up by the initial rotation of the handle spline 166.

Additional rotation of the handle spline 166 in the clockwise direction (arrow 333 in FIG. 8, arrow G in FIG. 15) past the loss motion angle 332 causes the disc shaft 62 to rotate with the handle spline 166. Rotation of the recliner handle 14 in the first rotational direction A shown in FIG. 1 results in the handle spline 166, the spring bracket 158, and the disc shaft 62 being rotated to the release angular position 36B shown in FIG. 16. When the recliner handle 14 is rotated in the first rotational direction A, rotational torque (arrow G in FIG. 16) is applied to the handle spline 166, retaining the handle spline 166 in the release angular position 36B. In certain embodiments, the handle spline 166 is rotated past the release angular position 36B when the recliner handle 14 is rotated further in the first rotational direction A.

Figure 16:
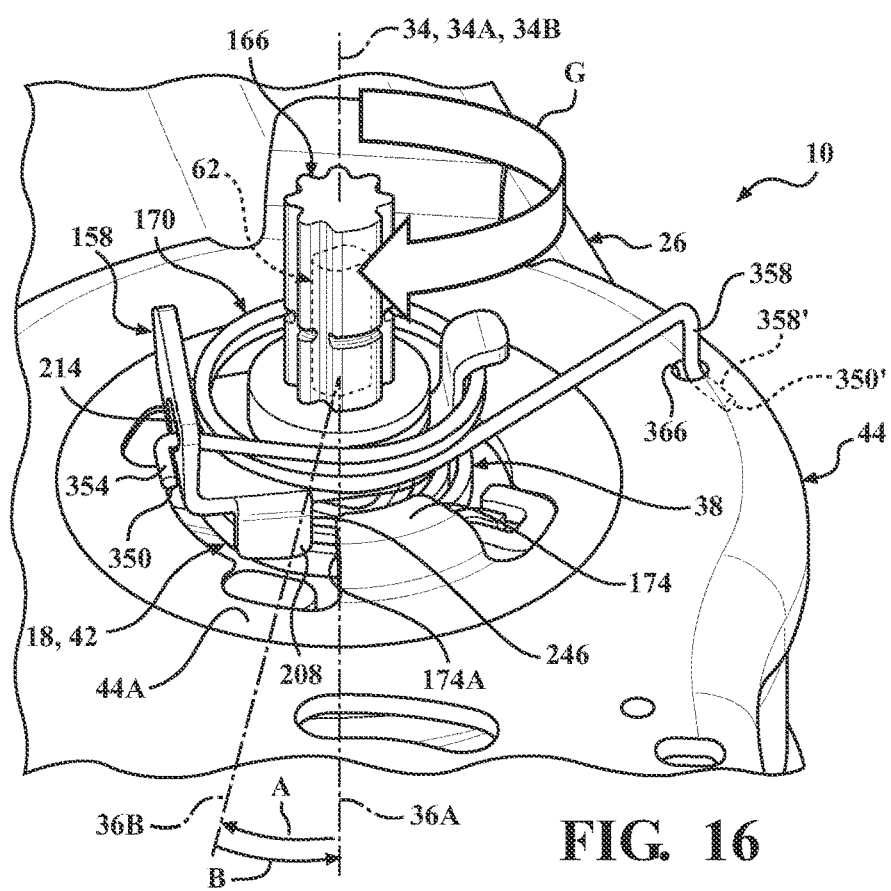
FIG. 16 is a perspective view of the recliner and the overload protection device of FIG. 14 after the handle spline is rotated to the release angular position, illustrating the stop flange of the spring bracket being spaced apart from the cutout of the recliner B-bracket.
Figure 17:
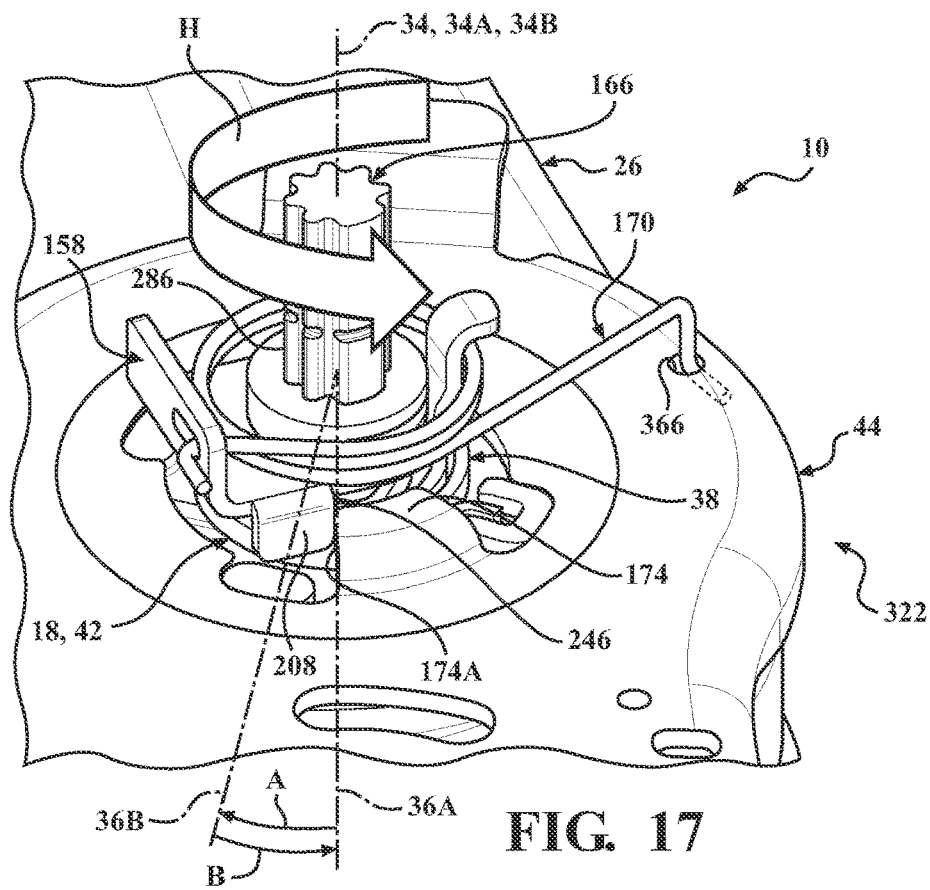
FIG. 17 is a perspective view of the recliner and the overload protection device of FIG. 16 after the handle spline is rotated towards the home angular position, illustrating the stop flange of the spring bracket frictionally engaged with the cutout of the recliner B-bracket.

When the handle spline 166 is in the release angular position 36B shown in FIG. 16, releasing the recliner handle 14 results in the handle inertia spring 170 automatically rotating the spring bracket 158 in the counterclockwise direction (arrow H) towards the home angular position 36A, as shown in FIG. 17. The handle spline 166 rotates with the spring bracket 158 since the plurality of splines 286 of the handle spline 166 are matingly engaged with the plurality of splines 254 in the alignment aperture 250 of the spring bracket 158. Spring torque in the handle inertia spring 170 retains the stop surface 246 on the spring bracket 158 in frictional engagement with the overload stop 174A of the recliner B-bracket 44.

Figure 18:
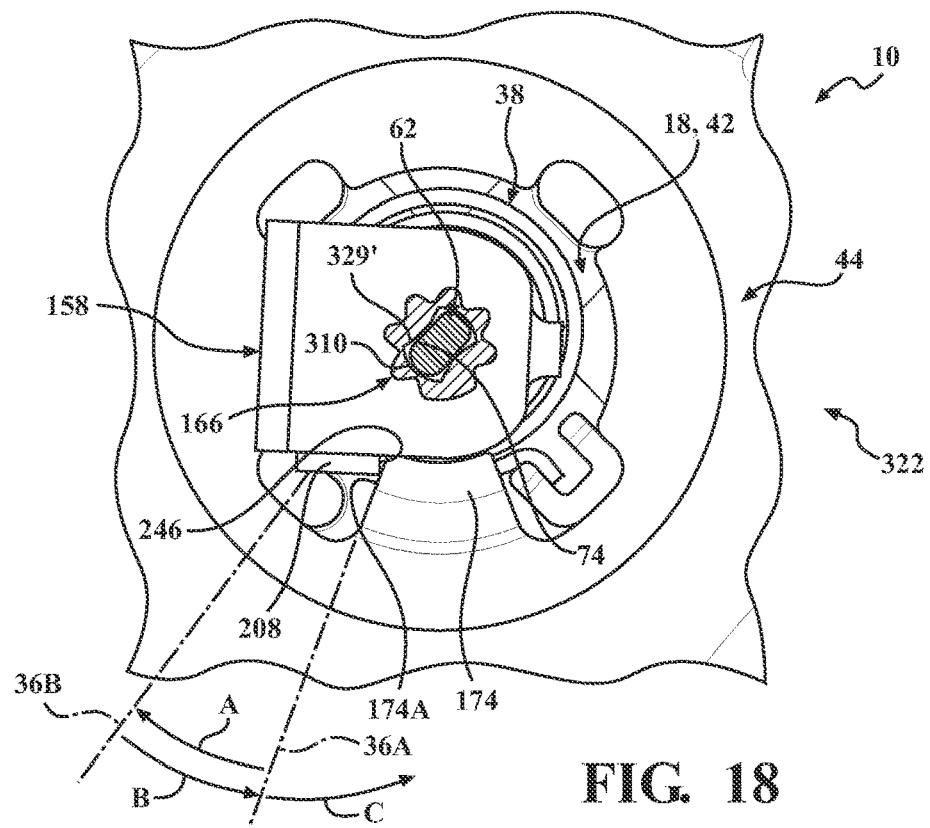
FIG. 18 is a cutaway view of the recliner and the overload protection device of FIG. 17 in the home angular position, illustrating the handle spline and the disc shaft in the neutral position with the disc shaft aperture of the handle spline disengaged from the disc shaft.
Figure 19:
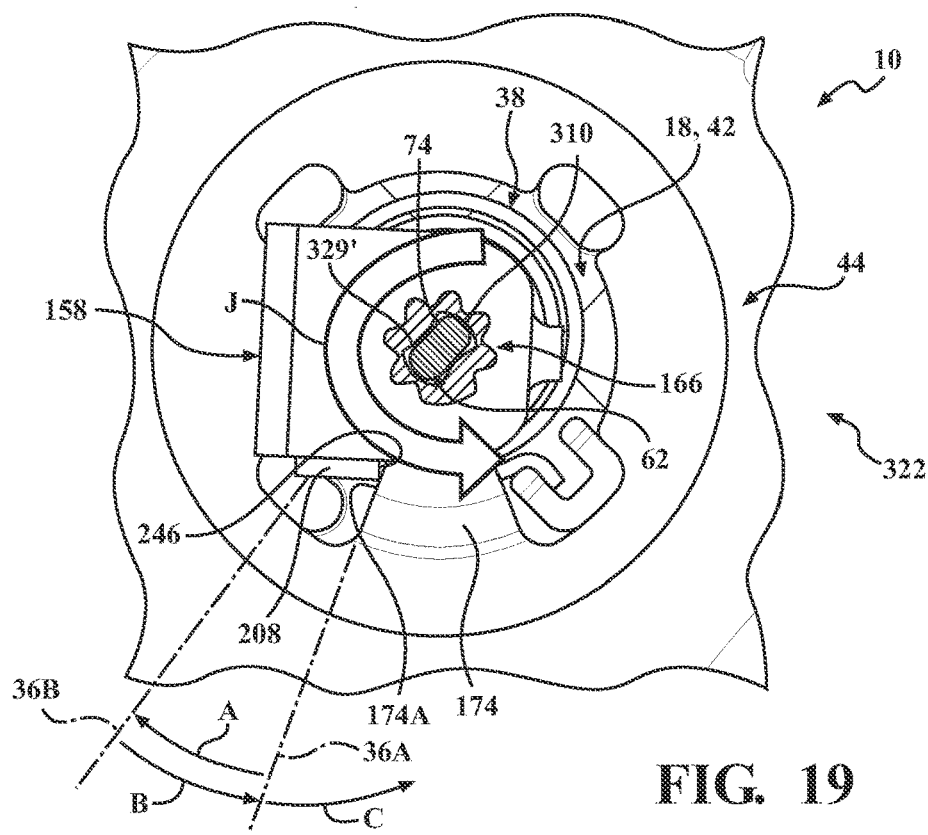
FIG. 19 is a cutaway view of the recliner and the overload protection device of FIG. 18 in the home angular position, illustrating abuse torque being applied to the handle spline while the disc shaft aperture is retained disengaged from the disc shaft.
Figure 20:
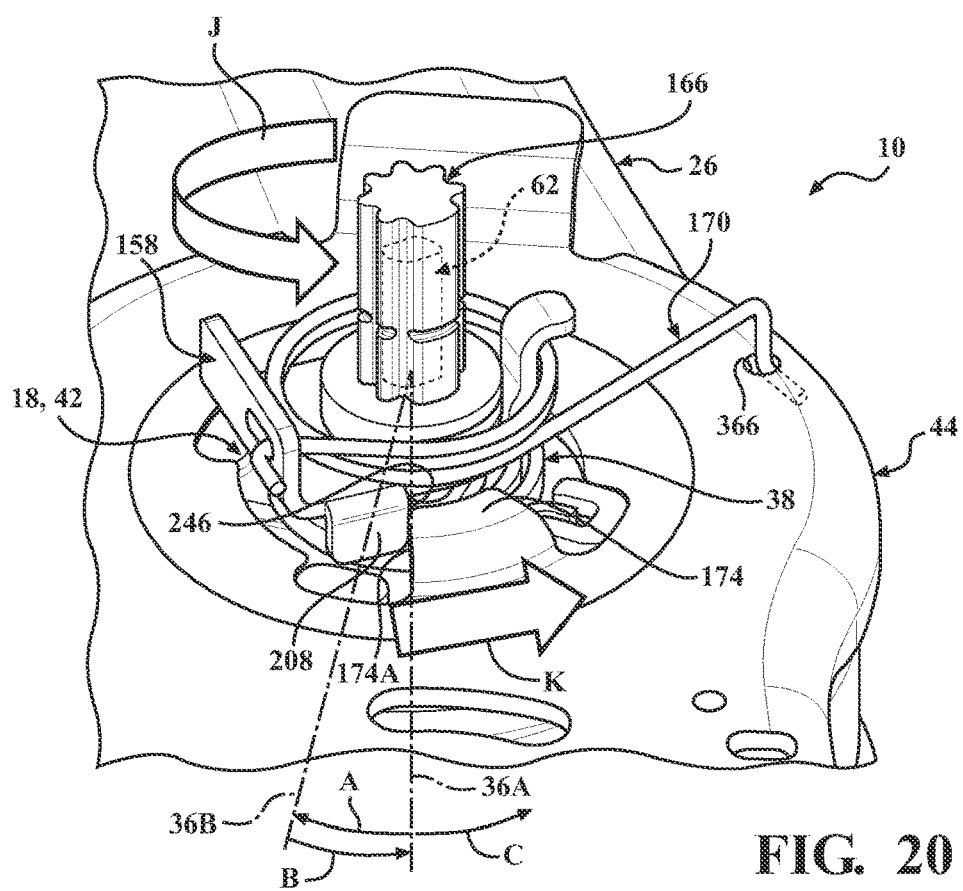
FIG. 20 is a perspective view of the recliner and the overload protection device of FIG. 19, illustrating abuse torque applied the handle spline resulting in load being applied to the cutout of the recliner B-bracket.

FIGS. 18 through 20 illustrate operation of the overload protection device 10 during abnormal use. Referring to FIG. 1, abnormal use occurs when a load is applied to the recliner handle 14 in the abuse rotation direction C when the recliner handle 14 is in the home position 14A. The handle spline 166 and the disc shaft 62 are shown in the home angular position 36A in FIG. 18 with the disc shaft 62 disengaged from the disc shaft aperture 310. The relative rotational positions of the handle spline 166 and the disc shaft 62 shown in FIG. 18 is alternatively described as the neutral position 322.

The relative rotational positions of the handle spline 166 and the disc shaft 62 in the neutral position 322 shown in FIG. 18 correspond to the recliner handle 14 being in the home position 14A shown in FIG. 1. The relative rotational position of the disc shaft aperture 310 with respect to the disc shaft 62 of FIG. 18 also corresponds to the relative rotational position of the disc shaft aperture 310 with respect to the disc shaft 62 shown in FIG. 7. In specific, when the handle spline 166 and the disc shaft 62 are in the neutral position 322 shown in FIGS. 7 and 18, the fourth side portion 329' of the disc shaft aperture 310 in the handle spline 166 tapers away from the adjacent shaft flat side portion 74 of the disc shaft 62. As such, the disc shaft aperture 310 is disengaged from the disc shaft 62 when the handle spline 166 is in neutral position 322 with no load applied to the recliner handle 14.

Referring to FIGS. 1 and 19, when the recliner handle 14 is in the home position 14A shown in FIG. 1 and a load is applied to the recliner handle 14 in the abuse rotation direction C, abuse torque J (FIG. 19) is applied to the handle spline 166. The abuse torque J applied to the handle spline 166 in the cam locking direction B is represented by arrow J shown in FIG. 19. An exemplary amount of abuse torque J is approximately 120 Nm applied to the recliner handle 14 in a cam locking direction B when the recliner handle 14 is in the home position 14A.

Referring to FIG. 19, the abuse torque J applied to the handle spline 166 urges the handle spline 166 to rotate past the home angular position 36A in the abuse rotation direction C. For typical disc recliners lacking the overload protection device 10, the abuse torque J applied to the handle spline 166 causes the handle spline 166 to rotate in the abuse rotation direction C past the home angular position 36A and causes the typical disc recliner to be overlocked. However, as shown in FIG. 19, the stop surface 246 on the spring bracket 158 of the overload protection device 10 is frictionally engaged with the overload stop 174A on the recliner B-bracket 44 when the handle spline 166 is in the neutral position 322. Further, the handle spline 166 is matingly engaged with the spring bracket 158 and rotationally travels with the spring bracket 158. More specifically, the plurality of splines 286 of the handle spline 166 are matingly engaged with the plurality of splines 254 in the alignment aperture 250 of the spring bracket 158 such that the handle spline 166 rotates with the spring bracket 158, as illustrated in FIGS. 10 and 12. Thus, abuse torque J applied to the handle spline 166 initiates rotation of the handle spline 166 in the abuse rotation direction C, causing the stop surface 246 on the stop flange 208 of the spring bracket 158 to impact the overload stop 174A on the tab 174 of the recliner B-bracket 44, as shown in FIG. 19. The engagement between the stop flange 208 and the overload stop 174A prevents rotation of the handle spline 166 in the abuse rotation direction C past the home angular position 36A. Referring to FIG. 20, the abuse torque J applied to the handle spline 166 is transferred to the spring bracket 158 and applies load K (illustrated by arrow K) to the overload stop 174A on the tab 174 of the recliner B-bracket 44. This effectively transfers the abuse torque J applied to the handle spline 166 to the tab 174 of the recliner B-bracket 44.

As shown in FIGS. 7, 9 and 20, the looseness between the disc shaft 62 and the disc shaft aperture 310 in the handle spline 166 prevents the abuse torque J from being transferred to the disc shaft 62. FIG. 7 shows the handle spline 166 and the disc shaft 62 in the neutral position 322 with the first side portion 328 and the fourth side portion 329' of the disc shaft aperture 310 tapering away from the adjacent shaft flat side portions 72, 74. FIG. 9 shows the handle spline 166 rotated in the counterclockwise direction 333' from the neutral position 322 shown in FIG. 7 through approximately the loss motion angle 332' with the overload stop 174A omitted from the recliner B-bracket 44. The abuse rotation direction C in FIG. 20 corresponds to counterclockwise direction 333' shown in FIG. 9. Referring to FIG. 9, the handle spline 166 would have to rotate in the counterclockwise direction 333' (abuse rotation direction C of FIG. 20) through approximately the loss motion angle 332' prior to the fourth side portion 329' of the disc shaft aperture 310 frictionally engaging the adjacent shaft flat side portion 74 of the disc shaft 62. The disc shaft 62 rotates with the handle spline 166 when the handle spline 166 rotates past the loss motion angle 332' in the counterclockwise direction 333' since the first and fourth side portions 328, 329' have frictionally engaged the respective adjacent shaft flat side portions 72, 74.

However, as shown in FIG. 20, frictional engagement between the stop surface 246 on the stop flange 208 of the spring bracket 158 and the overload stop 174A on the tab 174 of the recliner B-bracket 44 prevents rotation of the handle spline 166 in the abuse rotation direction C past the home angular position 36A. The abuse torque J applied to the recliner handle 14 is transferred through the handle spline 166 and loads up the spring bracket 158 against the tab 174 of the recliner B-bracket 44. The looseness between the disc shaft aperture 310 in the handle spline 166 and the disc shaft 62 prevents transferring the abuse torque J from the handle spline 166 to the disc shaft 62. Since the abuse torque J is transferred to the recliner B-bracket 44 instead of being transferred to the disc shaft 62, the disc shaft 62 is not rotated past the home angular position 36A when downward torque is applied to the recliner handle 14. The overload protection device 10 prevents the disc shaft 62 from being rotated in the abuse rotation direction C past the home angular position 36A, effectively preventing the recliner 18 from being overlocked. Further, internal components of the disc recliner assembly 42 are not directly loaded by downward torque of the recliner handle 14 since load applied by the abuse torque J is transferred between the recliner handle 14, the handle spline 166, the spring bracket 158, and the tab 174 of the recliner B-bracket 44.

Figure 21:
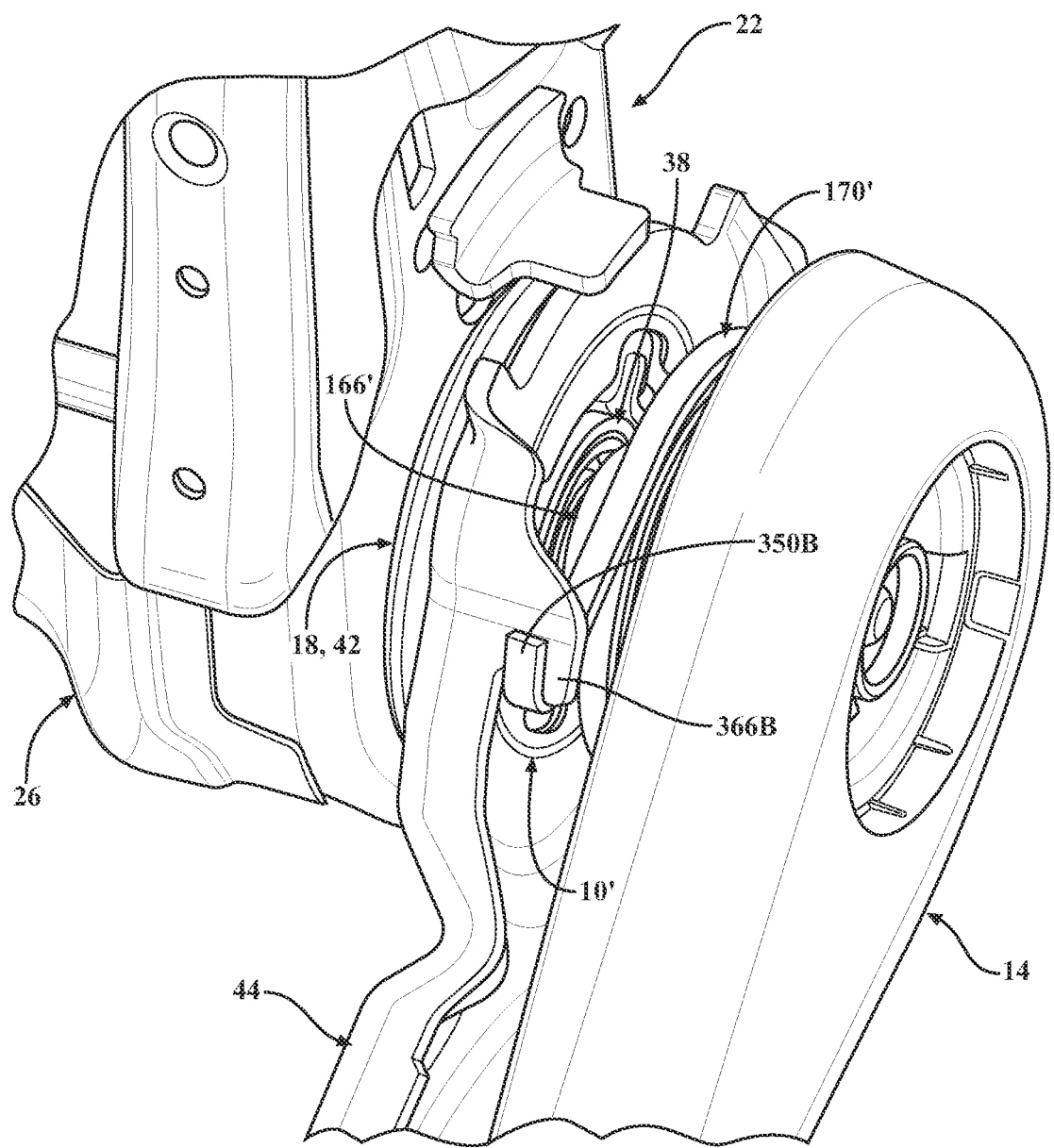
FIG. 21 is a fragmentary perspective view of a vehicle seat having an overload protection device operatively coupled between a recliner and a recliner handle, according to a second embodiment of the present invention.

A second embodiment of a recliner handle 14 with an overload protection device 10' is illustrated in FIGS. 21 through 26. The first embodiment of the overload protection device 10 illustrated in FIG. 2 includes a spring bracket 158 having a stop flange 208 that is assembled with a separate handle spline 166. In contrast, the overload protection device 10' shown in FIGS. 21 through 26 has a stop flange 208' integrated with the handle spline 166'. In addition, the handle inertia spring 170 shown in FIG. 2 is replaced with a handle inertia spring 170' that is operatively connected between the handle spline 166' and the recliner B-bracket 44, as shown in FIG. 21.

Figure 22:
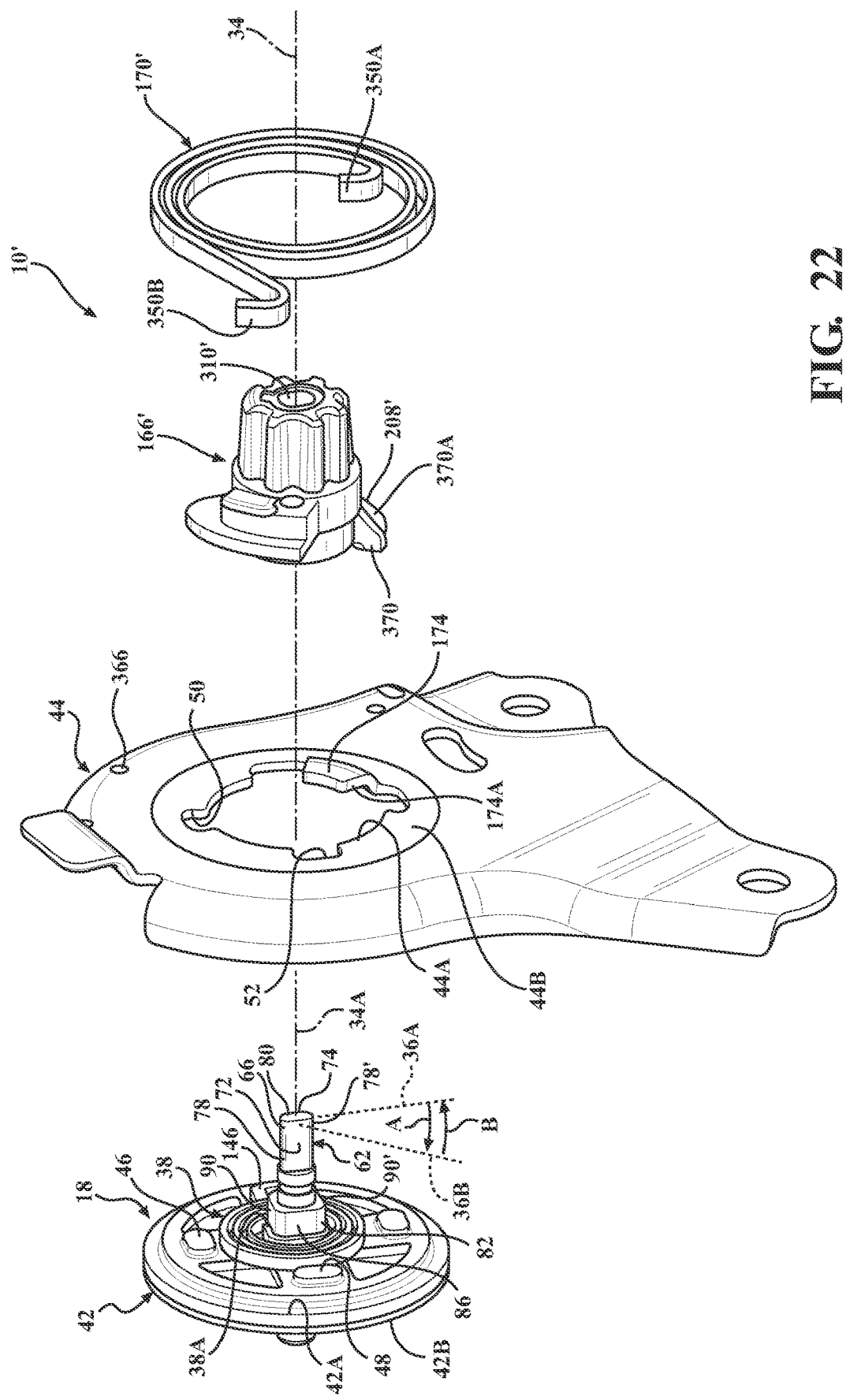
FIG. 22 is an exploded view of the overload protection device of FIG. 21, showing the recliner, a recliner B-bracket having a cutout with an overload stop, a handle spline with an integrated stop flange, and a handle inertia spring, according to a second embodiment of the present invention.

FIG. 22 shows an exploded view of components of the second embodiment of the overload protection device 10'. The handle spline 166' includes a disc shaft aperture 310' passing longitudinally through the handle spline 166'. The handle spline 166' is assembled with the recliner 18 by inserting the disc shaft 62 of the recliner 18 into the disc shaft aperture 310'. The handle inertia spring 170' of the second embodiment includes a first spring end 350A configured to frictionally engage with a first spring retention surface 370 on handle spline 166'. Further, a second spring end 350B of the handle inertia spring 170' is configured to frictionally engage with a spring retention flange 366B on the recliner B-bracket 44, as shown in FIG. 21.

Figure 23:
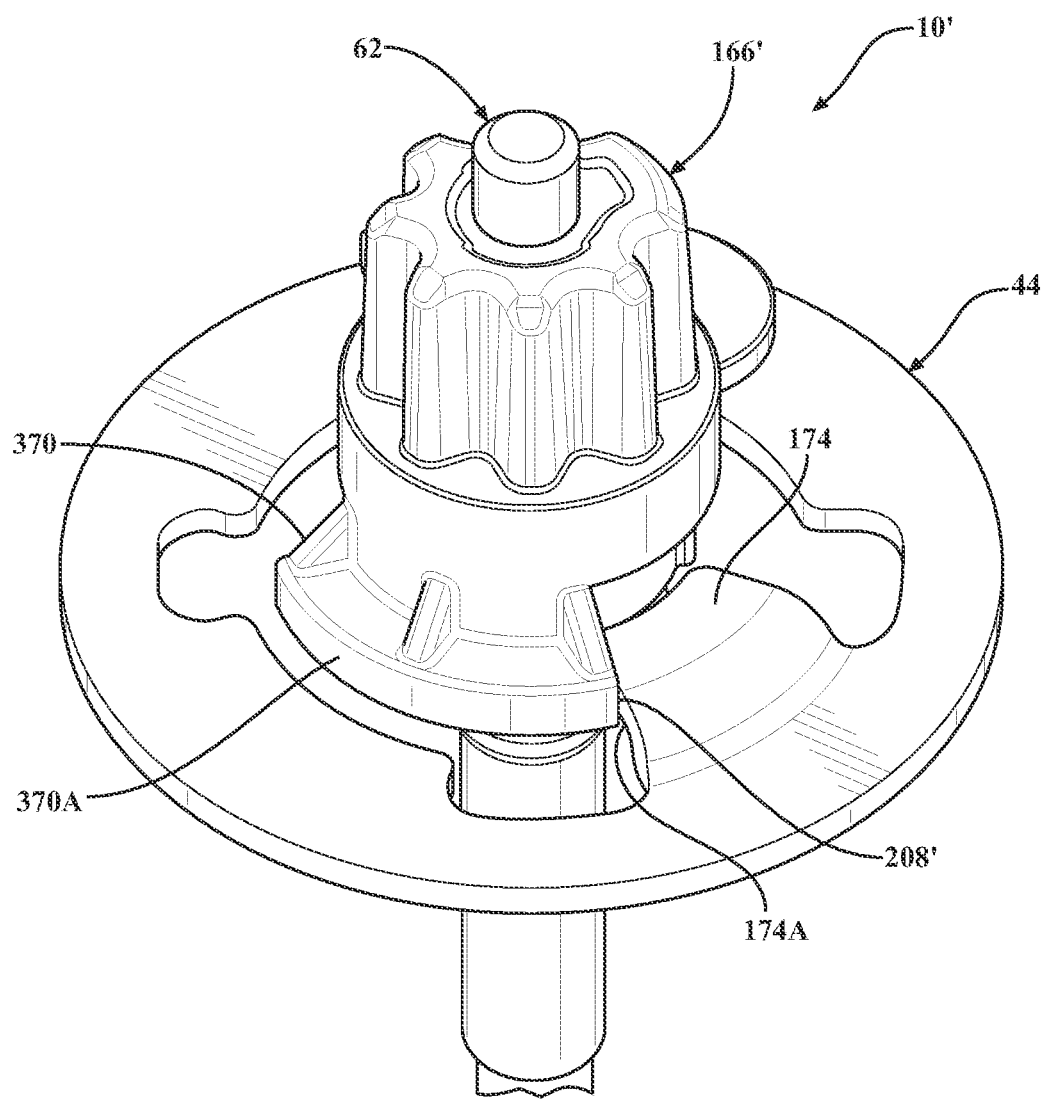
FIG. 23 is a cutaway perspective view of the overload protection device of FIG. 22, showing the integrated stop flange of the handle spline frictionally engaged with the overload stop on the recliner B-bracket cutout.

FIG. 23 shows the handle spline 166' assembled with the recliner B-bracket 44 and the disc shaft 62 of the second embodiment, illustrating the integrated stop flange 208' of the handle spline 166' frictionally engaged with the overload stop 174A of the recliner B-bracket 44. A comparison of the first embodiment shown in FIG. 15 and the second embodiment shown in FIG. 23 illustrates similarities between the first and second embodiments. For example, the stop flange 208 of the spring bracket 158 rotates with the handle spline 166 when the handle spline 166 is rotated, as shown and described with respect to FIGS. 15 through 17. Referring to FIG. 23, the stop flange 208' of the second embodiment rotates with the handle spline 166' since the stop flange 208' is integrally formed with the handle spline 166'.

Figure 24:
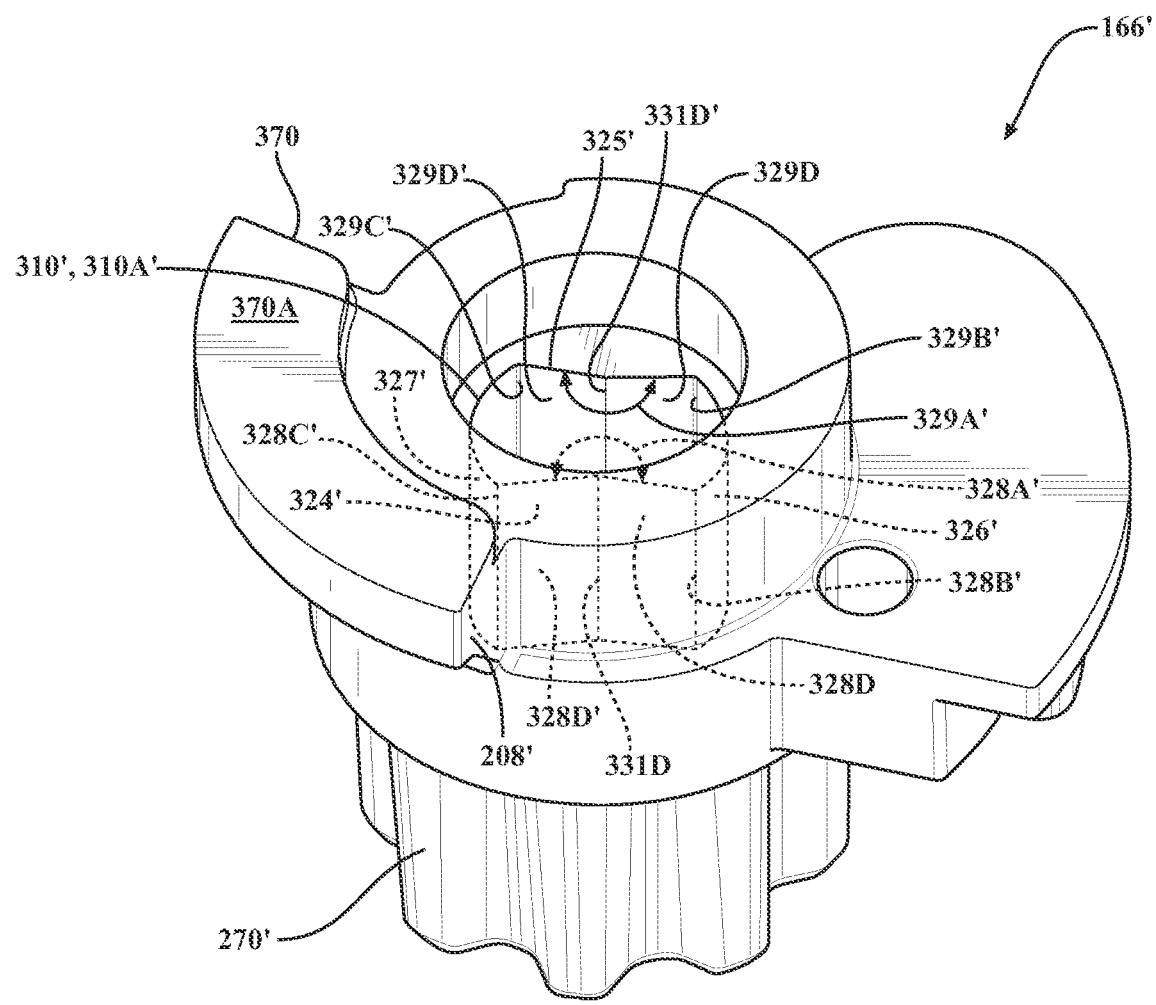
FIG. 24 is a partially transparent perspective view of the handle spline of FIG. 23, illustrating a disc shaft aperture passing through the handle spline.

In addition, the disc shaft aperture 310' of the handle spline 166' of the second embodiment is shaped and sized similarly to the disc shaft aperture 310 of the handle spline 166 in the first embodiment, as shown by comparing FIG. 24 and FIG. 7. Referring to FIG. 24, the disc shaft aperture 310' of the handle spline 166' of the second embodiment has an inner aperture portion 310A' sized and shaped to matingly engage with the elongated shaft end portion 66 of the disc shaft 62 while maintaining about 6 degrees of loss motion between the disc shaft 62 and the disc shaft aperture 310'. It is understood that the amount of degrees of loss motion between the disc shaft 62 and the disc shaft aperture 310' can be greater or less than about 6 degrees without varying the scope of the invention. The inner aperture portion 310A' of the disc shaft aperture 310' includes opposing first and second side walls 324', 325' and opposing first and second end walls 326', 327'. The first side wall 324' comprises a first side portion 328D extending at an angle from a second side portion 328D' such that an interior angle 328A' between the first side portion 328D and the second side portion 328D' is greater than 180 degrees, as measured within the disc shaft aperture 310'. Similarly, the second side wall 325' includes a third side portion 329D extending at an angle from a fourth side portion 329D' such that an interior angle 329A' between the third side portion 329D and the fourth side portion 329D' is greater than 180 degrees, as measured within the disc shaft aperture 310'. Further, the first side portion 328D is generally parallel to and spaced apart from the fourth side portion 329D'. Similarly, the second side portion 328D' is generally parallel to and spaced apart from the third side portion 329D. In addition, the first side portion 328D is non-parallel to the second side portion 328D'. Likewise, the third side portion 329D is non-parallel to the fourth side portion 329D'. In certain embodiments, one or more of the first, second, third, and fourth side portions 328D, 328D', 329D, 329D' include curved surfaces, tapered surfaces, and/or generally flat surfaces. Also shown in FIG. 24, extending between ends 328B', 329B' of the first side portion 328D and the third side portion 329D of the disc shaft aperture 310' is the first end wall 326'. Likewise, extending between ends 328C', 329C' of the second side portion 328D' and the fourth side portion 329D' is the second end wall 327'. In the embodiment shown in FIG. 24 the first and second end walls 326', 327' are curved walls.

Figure 26:
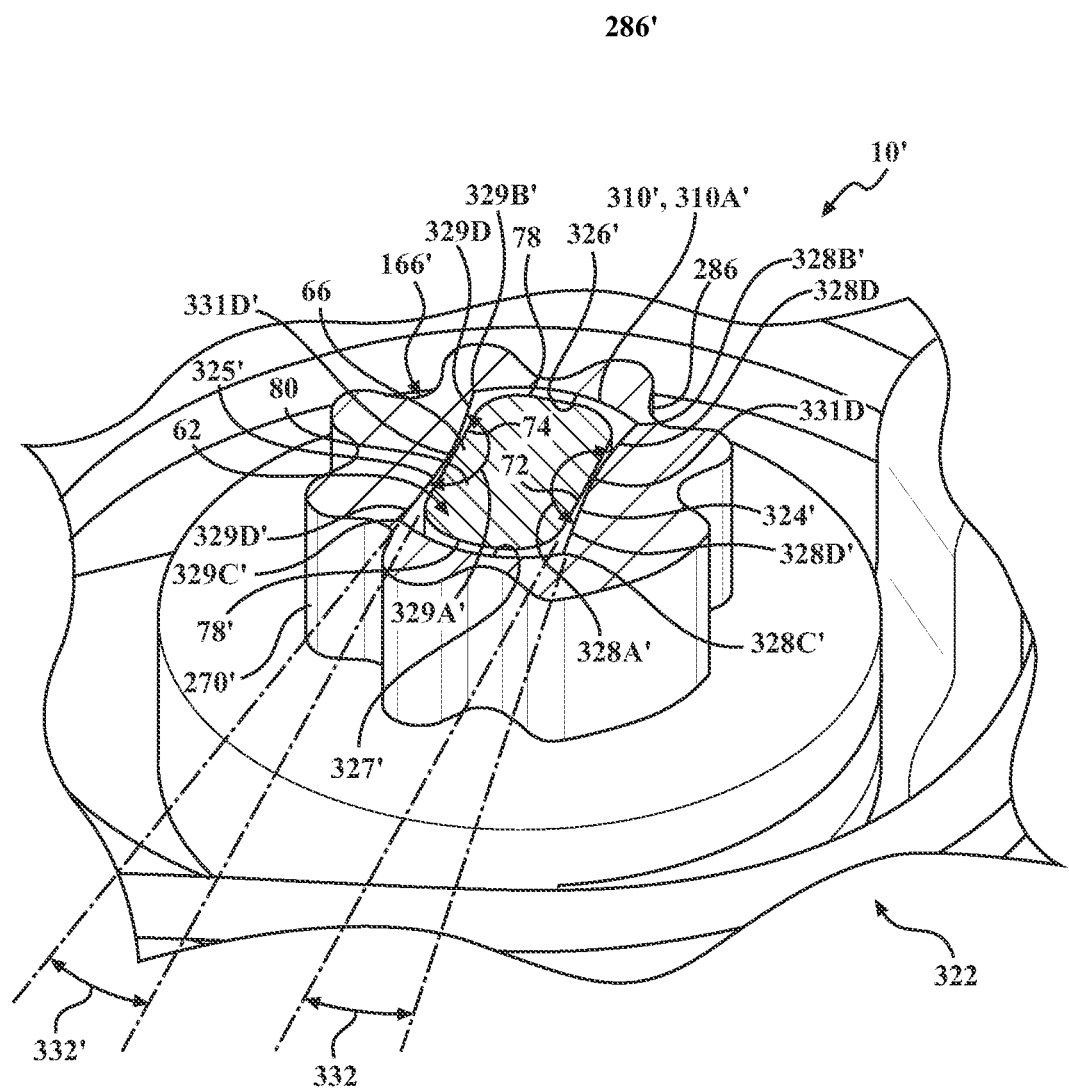
FIG. 26 is an enlarged cutaway perspective view of the handle spline and the disc shaft of FIG. 23, showing the disc shaft aperture in the handle spline and the disc shaft in a neutral position with the disc shaft aperture disengaged from the disc shaft.

FIG. 26 shows a cutaway perspective view of the handle spline 166' of the second embodiment assembled with the disc shaft 62. In FIG. 26, the disc shaft 62 and the disc shaft aperture 310' in the handle spline 166' are positioned in a neutral position 322 with the disc shaft aperture 310' disengaged from the disc shaft 62. Further, the inner aperture portion 310A' of the disc shaft aperture 310' is sized and shaped such that a first junction 331D of the first side portion 328D and the second side portion 328D' and a second junction 331D' of the third side portion 329D and the fourth side portion 329D' frictionally engage the respective adjacent shaft flat side portions 72, 74 of the disc shaft 62 when assembled, as shown in FIG. 26. It is understood that in certain embodiments the first and second junctions 331D, 331D' are spaced apart from the adjacent shaft flat side portions 72, 74 of the disc shaft 62 without varying the scope of the invention. When the disc shaft 62 is centered within the disc shaft aperture 310' in the neutral position 322 shown in FIG. 26, each of the first through fourth side portions 328D, 328D', 329D, 329D' of the disc shaft aperture 310' taper away from the adjacent shaft flat side portions 72, 74 of the disc shaft 62 with an approximate loss motion angle 332, 332'. Thus, each of the first through fourth side portions 328D, 328D', 329D, 329D' of the disc shaft aperture 310' are essentially disengaged from the adjacent shaft flat side portions 72, 74 of the disc shaft 62 when the handle spline 166' and disc shaft 62 are in the neutral position 322 shown in FIG. 26. The approximate loss motion angle 332, 332' represents the loss motion between the handle spline 166' and the disc shaft 62 when the handle spline 166' is rotated. As with the first embodiment, rotating the handle spline 166' from the neutral position 322 less than the loss motion angle 332 results in the handle spline 166' rotating independently of the disc shaft 62. The disc shaft aperture 310' engages with the disc shaft 62 when the handle spline 166' rotates approximately the loss motion angle 332 from the neutral position 322 shown in FIG. 26. The disc shaft 62 rotates with the handle spline 166' as long as the disc shaft aperture 310' is engaged with the disc shaft 62.

Figure 25:
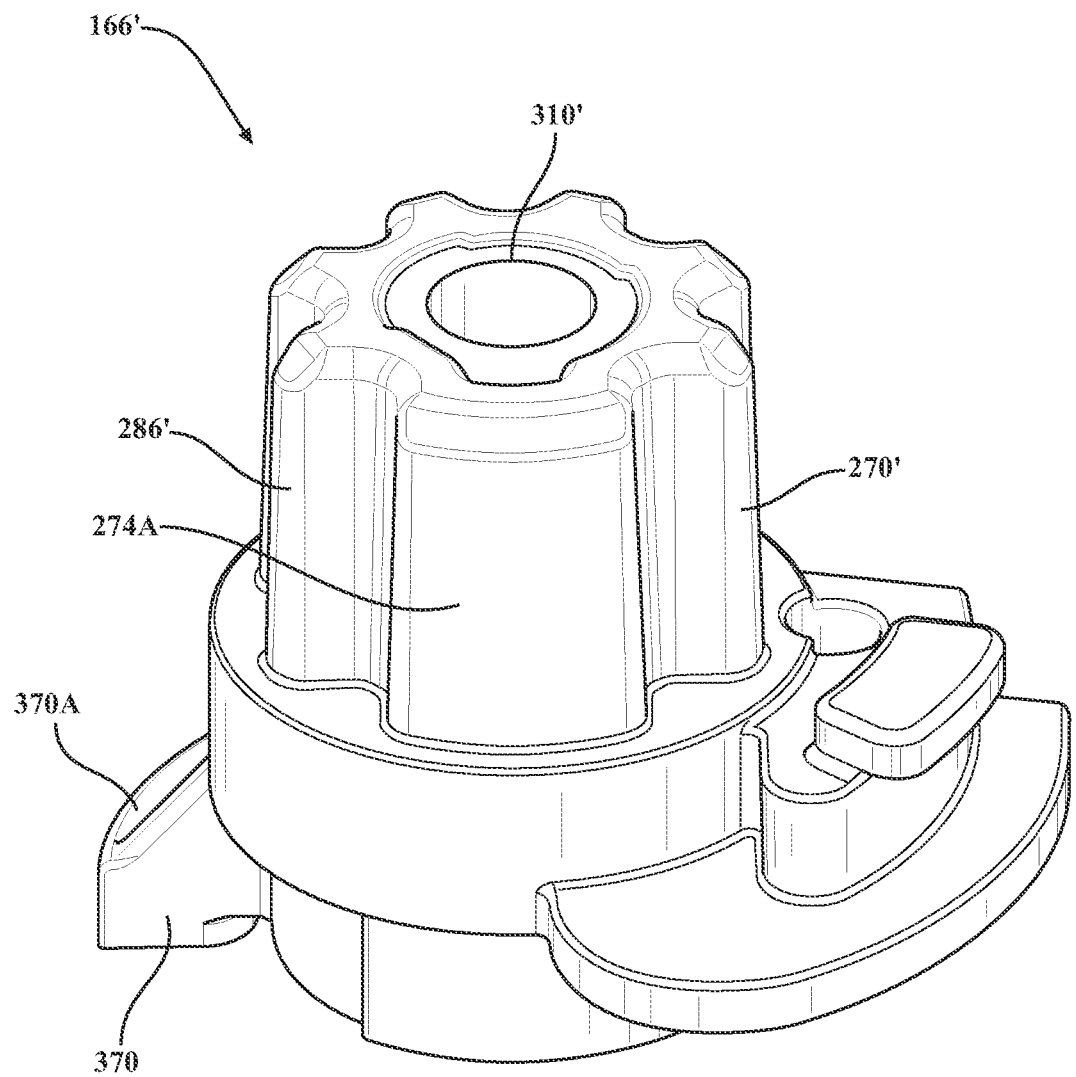
FIG. 25 is a perspective view of the handle spline of FIG. 24, illustrating exterior surfaces of the handle spline.

Referring to FIG. 25, the handle spline 166' has a plurality of splines 286' spaced around an outer perimeter 274A of a splined portion 270' configured to matingly engage with the recliner handle 14. Further, the disc shaft aperture 310' extends axially through the handle spline 166'. Also shown in FIG. 25, the handle spline 166' includes a spring retention flange 370A having a first spring retention surface 370 configured to frictionally engage and retain the first spring end 350A of the handle inertia spring 170'. As shown in FIG. 24, the spring retention flange 370A extends circumferentially partially around the handle spline 166'. In the embodiment shown in FIG. 24, the spring retention flange 370A extends between the stop flange 208' and the first spring retention surface 370. It is understood that the stop flange 208' and the first spring retention surface 370 can vary in size, shape, position, and location, including being separated on the handle spline 166' without varying the scope of the invention.

The handle spline 166' shown in FIGS. 24 and 25 is sized and shaped to be formed out of a plastic material using a molding process. An exemplary suitable plastic material is Nylon 6/6 with about 30% glass fill. Alternatively, the handle spline 166' is formable out of a metal such as a zinc aluminum alloy and similar metals. An exemplary, suitable zinc aluminum alloy is Zamak 5 (aluminum 4%, copper 1%, and zinc 95%). It is understood that the handle spline 166' can be formed of alternate metals and molded from alternate plastic materials without varying the scope of the invention.

One benefit of the recliner handle 14 with the overload protection device 10, 10' is damage to the recliner 18 is prevented when downward torque (abuse torque) is applied to the recliner handle 14 when the recliner handle 14 is in the home position 14A. A second benefit is the abuse torque applied to the recliner handle 14 is transferred away from the recliner 18. A third benefit of the overload protection device 10, 10' between the recliner handle 14 and the recliner 18 is overloading the recliner 18 is avoided when downward torque is applied to the recliner handle 14.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. An overload protection device for a reclining vehicle seat, the overload protection device comprising:
    an overload stop fixedly coupled to the vehicle seat;
    a recliner having a disc shaft, wherein the disc shaft is rotatable to actuate the recliner between a locked condition and an unlocked condition for providing reclining adjustment of the vehicle seat;
    a handle spline rotatable in a first rotational direction from a first position associated with the locked condition to a second position associated with the unlocked condition, wherein the handle spline defines a disc shaft aperture with the disc shaft received in the disc shaft aperture, wherein the disc shaft and the disc shaft aperture are rotationally decoupled when the handle spline is in the first position and rotationally coupled when the handle spline is in the second position; and
    a stop flange rotationally coupled to the handle spline and arranged to abut the overload stop when the handle spline is in the first position;
    wherein engagement between the stop flange and the overload stop prevents rotation of the handle spline in a second rotational direction opposite the first rotational direction and away from the second position when the handle spline is in the first position to prevent an overload force being transferred to the recliner.

2. The overload protection device of claim 1, wherein:
    said first position and said second position being spaced apart by a lost motion angle.

3. The overload protection device of claim 2, wherein:
    a handle inertia spring is operatively coupled between said handle spline and the vehicle seat, said handle inertia spring biasing said stop flange towards abutment with said overload stop.

4. The overload protection device of claim 3, wherein:
    said recliner is in said locked condition when said disc shaft is in a home angular position; and
    said recliner is in said unlocked condition when said disc shaft is in a release angular position.

5. The overload protection device of claim 4, wherein:
    said disc shaft is rotatable between said home angular position and said release angular position;
    rotating said disc shaft in said first rotational direction from said home angular position to said release angular position reconfigures said recliner from said locked condition to said unlocked condition; and
    rotating said disc shaft in said second rotational direction from said release angular position to said home angular position reconfigures said recliner from said unlocked condition to said locked condition.

6. The overload protection device of claim 5, further comprising:
    a recliner handle coupled to the handle spline and rotatable between a home position and a recline release position;
    wherein when said recliner handle is in said home position, said handle spline is in said first position, and said disc shaft aperture is rotationally decoupled from said disc shaft, applying torque in said first rotational direction to said recliner handle and rotating said recliner handle in said first rotational direction less than said lost motion angle results in said handle spline rotating in said first rotational direction with said disc shaft rotationally decoupled from said disc shaft aperture.

7. The overload protection device of claim 6, wherein:
    when said recliner handle is spaced apart from said home position by at least said lost motion angle, applying torque in said first rotational direction to said recliner handle and rotating said recliner handle in said first rotational direction results in said handle spline rotating in said first rotational direction with said disc shaft rotationally coupled with said disc shaft aperture; and
    said disc shaft rotating with said handle spline when said disc shaft is rotationally coupled with said disc shaft aperture.

8. The overload protection device of claim 7, wherein:
    when said handle spline is in said first position with said stop flange abutting said overload stop, rotating said handle spline in said first rotational direction disengages said stop flange from said overload stop.

9. The overload protection device of claim 8, wherein:
    when said recliner handle is rotated in said first rotational direction to said recline release position, said handle spline is rotated to said release angular position, said disc shaft aperture rotationally coupled with said disc shaft rotates said disc shaft to said release angular position, and said disc shaft rotated to said release angular position reconfigures said recliner into said unlocked condition.

10. The overload protection device of claim 1, wherein:
    when said handle spline is in said first position with said disc shaft aperture rotationally decoupled from said disc shaft and when said stop flange is abutting said overload stop, applying torque in said second rotational direction to said handle spline results in load being applied to said overload stop by said stop flange while retaining said disc shaft aperture rotationally decoupled from said disc shaft.

11. The overload protection device of claim 4, wherein said disc shaft aperture has an elongated aperture portion comprising:
    a first side wall comprising a first portion and a second portion joining at a first junction, said first and second portions having a first end and a second end, respectively, spaced apart from said first junction, and said first and second portions being non-parallel;
    a second side wall comprising a third portion and a fourth portion joining at a second junction, said third and fourth portions having a third end and a fourth end, respectively, spaced apart from said second junction, and said third and fourth portions being non-parallel;
    a first end wall adjoining said first end of said first side wall and said third end of said second side wall; and
    a second end wall adjoining said second end of said first side wall and said fourth end of said second side wall.

12. The overload protection device of claim 11, wherein said elongated aperture portion of said disc shaft aperture comprises:
    said first portion of said first side wall opposing said third portion of said second side wall, said second portion of said first side wall opposing said fourth portion of said second side wall, said first end of said first portion of said first side wall and said third end of said third portion of said second side wall being spaced further apart than said first junction and said second junction; and said second end of said second portion of said first side wall and said fourth end of said fourth portion of said second side wall being spaced further apart than said first junction and said second junction.

13. The overload protection device of claim 12, wherein said elongated aperture portion of said disc shaft aperture comprises:
a first interior angle between said first portion and said second portion of said first side wall being greater than 180 degrees; and
a second interior angle between said third portion and said fourth portion of said second side wall being greater than 180 degrees.

14. The overload protection device of claim 13, wherein: said disc shaft has an elongated portion having a rounded rectangular shaped cross-section with opposing first and second shaft flat side walls.

15. The overload protection device of claim 14, wherein: when said handle spline is in said first position and said disc shaft is in said home angular position, said first portion of said first side wall of said disc shaft aperture extends away from said first shaft flat side wall of said disc shaft by said lost motion angle and said fourth portion of said second side wall of said disc shaft aperture extends away from said second shaft flat side wall of said disc shaft by said lost motion angle.

16. The overload protection device of claim 15, wherein: when said handle spline is in said first position and said disc shaft is in said home angular position, said second portion of said first side wall of said disc shaft aperture extends away from said first shaft flat side wall of said disc shaft by said lost motion angle and said third portion of said second side wall of said disc shaft aperture extends away from said second shaft flat side wall of said disc shaft by said lost motion angle.

17. The overload protection device of claim 16, wherein: when said handle spline is in said first position, said disc shaft is in said home angular position and rotationally decoupled from said disc shaft aperture of said handle spline, rotating said handle spline in said first rotational direction at least said lost motion angle frictionally engages said second portion of said first side wall and said third portion of said second side wall of said disc shaft aperture with said first shaft flat side wall and said second shaft flat side wall, respectively, of said disc shaft.

18. The overload protection device of claim 6, wherein: said stop flange is integrally formed with a spring bracket; and
said spring bracket is fixedly coupled to said handle spline.

19. The overload protection device of claim 18, wherein: said handle inertia spring is operatively coupled between said spring bracket and the vehicle seat.

20. The overload protection device of claim 19, wherein: said handle spline has an outer profile; and
said spring bracket has a main bracket portion, an alignment aperture passing through said main bracket portion, said stop flange projecting from said main bracket portion, and said alignment aperture having an inner profile configured to matingly engage with said outer profile of said handle spline.

21. The overload protection device of claim 20, wherein: said handle inertia spring is operatively coupled between said spring bracket and the vehicle seat, said handle inertia spring rotationally biasing said stop flange of said spring bracket towards abutment with said overload stop.

22. The overload protection device of claim 21, wherein: said recliner including a return spring operatively coupled between said recliner and said disc shaft, said return spring biasing said disc shaft towards said home angular position; and
said handle spline being biased towards said first position by said handle spline being fixedly coupled to said spring bracket and said spring bracket being biased towards abutment with said overload stop by said handle inertia spring.

23. The overload protection device of claim 22, wherein when said recliner handle is unloaded by an externally-applied load:
said return spring automatically rotates said disc shaft to said home angular position;
said handle inertia spring automatically rotates said spring bracket to abutment with said overload stop;
said handle spline automatically rotates to said first position by said spring bracket rotating to abutment with said overload stop; and
said recliner handle automatically rotates to said home position by said handle spline rotating to said first position.

24. The overload protection device of claim 23, wherein: said spring bracket comprising a first flange and a second flange projecting from said main bracket portion with said first flange including a spring slot; and
said handle inertia spring being a coil spring having a coiled portion with a central passageway extending through said coiled portion, a first spring end, and a second spring end, said first spring end configured to pass through said spring slot in said first flange, and said second spring end configured to pass through a spring retention hole in the vehicle seat, and said handle spline and said second flange passing through said central passageway.

25. The overload protection device of claim 24, wherein: said outer profile of said handle spline including a first alignment feature configured to matingly engage with a second alignment feature of said inner profile of said alignment aperture of said spring bracket.

26. The overload protection device of claim 1, wherein: said stop flange is integrally formed with said handle spline.

* * * * *